US012754447B2

(12) United States Patent
Heber

(10) Patent No.: US 12,754,447 B2
(45) Date of Patent: Oct. 6, 2026

(54) BACKLIGHT WITH OPTICAL FILM, ILLUMINATION DEVICE THEREWITH, AND DISPLAY SCREEN

(71) Applicant: siOPTICA GmbH, Jena (DE)

(72) Inventor: André Heber, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 19/479,635

(22) PCT Filed: Jun. 4, 2024

(86) PCT No.: PCT/EP2024/065261
§ 371 (c)(1),
(2) Date: Oct. 28, 2025

(87) PCT Pub. No.: WO2025/016603
PCT Pub. Date: Jan. 23, 2025

(65) Prior Publication Data
US 2026/0118707 A1 Apr. 30, 2026

(30) Foreign Application Priority Data
Jul. 18, 2023 (DE) ..................... 10 2023 118 933.6

(51) Int. Cl.
*G02F 1/13* (2006.01)
*G02F 1/1335* (2006.01)
(Continued)

(52) U.S. Cl.
CPC ...... *G02F 1/1323* (2013.01); *G02F 1/133528* (2013.01); *G02F 1/133606* (2013.01);
(Continued)

(58) Field of Classification Search
CPC ............ G02F 1/1323; G02F 1/133528; G02F 1/133606; G02F 1/13362; G02F 1/133634; G02F 1/1347
See application file for complete search history.

(56) References Cited

U.S. PATENT DOCUMENTS 4,695,131 A 9/1987 Balkwill et al.
5,993,940 A 11/1999 Ouderkirk et al.
(Continued)

FOREIGN PATENT DOCUMENTS

CN 103091883 B 11/2015
CN 111448486 A 7/2020
(Continued)

OTHER PUBLICATIONS

Choi, et al., Optical anisotropy conversion of retarder film made of rodlike and crosslike reactive molecules, and its dependence on the relative ratio and the orientation of the constituent molecules, Optical Materials (2020), 99, Article No./ID 109531, (5 pages).
(Continued)

*Primary Examiner* — Kwang-Su Yang
(74) *Attorney, Agent, or Firm* — Christensen, Fonder, Dardi & Busse PLLC; John P. Fonder

(57) ABSTRACT

A backlight extending in a planar manner, emits light and has an optical film for controlling and limiting a viewing angle range of a viewer. The optical film includes a first polarization layer with a first absorption axis, which forms an angle of from 0° to 30°, inclusive, with a surface normal of the optical film, at least one phase-shifting compensation layer for improving the limiting of the viewing angle range, and a second polarization layer with a second absorption axis oriented parallel to the surface of the optical film. Different configurations and combinations of compensation layers are provided which are formed to be spatially homogeneous and comprise uniaxially or biaxially birefringent
(Continued)

materials. The materials and thicknesses of the compensation layers are such that luminance is minimal in a specified solid angle range which does not comprise the entire half-space except for a cone cut out along the viewing direction.

15 Claims, 10 Drawing Sheets

(51) Int. Cl.
*G02F 1/13357* (2006.01)
*G02F 1/13363* (2006.01)
*G02F 1/1347* (2006.01)

(52) U.S. Cl.
CPC .... *G02F 1/13362* (2013.01); *G02F 1/133634* (2013.01); *G02F 1/1347* (2013.01)

(56) References Cited

U.S. PATENT DOCUMENTS

| | | | |
|---|---|---|---|
| 6,559,915 B1 * | 5/2003 | Amimori .......... G02F 1/133504 349/96 | |
| 6,765,550 B2 | 7/2004 | Janick et al. | |
| 8,982,300 B2 | 3/2015 | Umemoto | |
| 8,988,643 B2 | 3/2015 | Yang et al. | |
| 9,229,253 B2 | 1/2016 | Schwartz et al. | |
| 9,229,261 B2 | 1/2016 | Schwartz et al. | |
| 9,459,472 B2 | 10/2016 | Kim et al. | |
| 9,881,531 B2 | 1/2018 | Klippstein et al. | |
| 10,126,575 B1 | 11/2018 | Robinson et al. | |
| 10,303,030 B2 | 5/2019 | Robinson et al. | |
| 10,551,648 B2 | 2/2020 | Jeon et al. | |
| 10,627,670 B2 | 4/2020 | Robinson et al. | |
| 10,649,248 B1 | 5/2020 | Fan Jiang et al. | |
| 10,670,921 B2 | 6/2020 | Yanai | |
| 10,712,608 B2 | 7/2020 | Robinson et al. | |
| 10,782,545 B2 | 9/2020 | Smith et al. | |
| 10,788,710 B2 | 9/2020 | Robinson et al. | |
| 10,802,356 B2 | 10/2020 | Harrold et al. | |
| 10,816,711 B2 | 10/2020 | Yanai | |
| 10,823,990 B2 | 11/2020 | Acreman et al. | |
| 10,871,666 B2 | 12/2020 | Saitoh et al. | |
| 10,921,622 B2 | 2/2021 | Chen et al. | |
| 10,935,714 B2 | 3/2021 | Woodgate et al. | |
| 10,948,648 B2 | 3/2021 | Ihas et al. | |
| 10,955,715 B2 | 3/2021 | Woodgate et al. | |
| 10,976,578 B2 | 4/2021 | Robinson et al. | |
| 11,016,318 B2 | 5/2021 | Robinson et al. | |
| 11,070,791 B2 | 7/2021 | Woodgate et al. | |
| 11,079,645 B2 | 8/2021 | Harrold et al. | |
| 11,092,851 B2 | 8/2021 | Robinson et al. | |
| 11,099,433 B2 | 8/2021 | Robinson et al. | |
| 11,109,014 B2 | 8/2021 | Robinson et al. | |
| 11,115,647 B2 | 9/2021 | Woodgate et al. | |
| 11,181,780 B2 | 11/2021 | Robinson et al. | |
| 11,187,945 B2 | 11/2021 | Harrold et al. | |
| 11,474,396 B2 | 10/2022 | Robinson et al. | |
| 11,474,397 B2 | 10/2022 | Robinson et al. | |
| 11,714,317 B2 | 8/2023 | Chen et al. | |
| 11,762,226 B2 | 9/2023 | Jitsui | |
| 11,906,828 B2 | 2/2024 | Heber | |
| 12,321,055 B2 | 6/2025 | Jitsui | |
| 2006/0103797 A1 | 5/2006 | Sasaki et al. | |
| 2006/0290854 A1 | 12/2006 | Hisatake | |
| 2008/0278663 A1 | 11/2008 | Krishnan et al. | |
| 2009/0153783 A1 | 6/2009 | Umemoto | |
| 2010/0092784 A1 | 4/2010 | Kamada et al. | |
| 2011/0128470 A1 | 6/2011 | Yorita et al. | |
| 2012/0235891 A1 | 9/2012 | Nishitani et al. | |
| 2013/0100112 A1 | 4/2013 | Yeh et al. | |
| 2013/0162924 A1 | 6/2013 | Sahouani et al. | |
| 2013/0308185 A1 | 11/2013 | Robinson et al. | |
| 2017/0176761 A1 | 6/2017 | Kim | |
| 2017/0295328 A1 | 10/2017 | Iwaski | |
| 2018/0210243 A1 | 7/2018 | Fang et al. | |
| 2018/0321523 A1 | 11/2018 | Robinson et al. | |
| 2019/0064557 A1 | 2/2019 | Yanai | |
| 2019/0094626 A1 | 3/2019 | Yanai | |
| 2019/0293974 A1 | 9/2019 | Chen et al. | |
| 2020/0026114 A1 | 1/2020 | Harrold et al. | |
| 2020/0142234 A1 | 5/2020 | Iwasaki et al. | |
| 2020/0292878 A1 | 9/2020 | Sekiguchi et al. | |
| 2020/0404139 A1 | 12/2020 | Masuda et al. | |
| 2021/0096412 A1 | 4/2021 | Iwasaki et al. | |
| 2021/0109270 A1 | 4/2021 | Hoshino et al. | |
| 2021/0149233 A1 | 5/2021 | Robinson et al. | |
| 2021/0397034 A1 | 12/2021 | Taheri et al. | |
| 2022/0236470 A1 * | 7/2022 | Hong .................. G02B 5/3083 | |
| 2022/0276522 A1 | 9/2022 | Chen et al. | |
| 2023/0053738 A1 | 2/2023 | Heber et al. | |
| 2024/0219606 A1 | 7/2024 | Ko et al. | |

FOREIGN PATENT DOCUMENTS

| | | | |
|---|---|---|---|
| CN | 112334797 A | 2/2021 | |
| CN | 115210616 A | 10/2022 | |
| CN | 115421323 A | 12/2022 | |
| DE | 2805970 A1 | 9/1979 | |
| DE | 19711827 A1 | 11/1997 | |
| DE | 69825251 T2 | 12/2004 | |
| DE | 60022081 T2 | 6/2006 | |
| DE | 10 2011 083662 A1 | 4/2013 | |
| DE | 11 2015 000351 T5 | 10/2016 | |
| DE | 10 2016 003627 A1 | 9/2017 | |
| DE | 10 2017 125633 A1 | 11/2018 | |
| DE | 10 2017 007669 A1 | 2/2019 | |
| DE | 10 2019 003383 A1 | 11/2019 | |
| DE | 10 2019 218286 A1 | 5/2021 | |
| DE | 10 2019 009071 A1 | 6/2021 | |
| DE | 10 2020 006110 B3 | 9/2021 | |
| DE | 10 2020 008062 A1 | 4/2022 | |
| DE | 10 2021 105595 B3 | 5/2022 | |
| DE | 10 2022 102390 B3 | 6/2022 | |
| DE | 10 2021 128224 B3 | 9/2022 | |
| DE | 10 2021 110645 A1 | 10/2022 | |
| DE | 10 2021 112947 A1 | 11/2022 | |
| DE | 10 2021 122466 B3 | 2/2023 | |
| DE | 10 2023 110 269 B3 | 12/2023 | |
| DE | 10 2022 134123 A1 | 6/2024 | |
| EP | 2 098 906 A1 | 9/2009 | |
| JP | H11101964 A | 4/1999 | |
| JP | 2005128212 A | 5/2005 | |
| JP | 2007-155783 A | 6/2007 | |
| JP | 2008165201 A | 7/2008 | |
| JP | 2008275976 A | 11/2008 | |
| JP | 2009145776 A | 7/2009 | |
| JP | 2009244356 A | 10/2009 | |
| JP | 5566178 B2 | 8/2014 | |
| JP | 2016027387 A | 2/2016 | |
| JP | 2018200387 A | 12/2018 | |
| JP | 6596101 B2 | 10/2019 | |
| JP | 6641005 B2 | 2/2020 | |
| JP | 6719552 B2 | 7/2020 | |
| JP | 6719558 B2 | 7/2020 | |
| JP | 6794422 B2 | 12/2020 | |
| JP | 7047405 B2 | 4/2022 | |
| KR | 101182470 B1 | 9/2012 | |
| KR | 20180061717 A | 6/2018 | |
| KR | 20190070843 A | 6/2019 | |
| KR | 102647572 B1 | 3/2024 | |
| KR | 102766363 B1 | 2/2025 | |
| TW | 200527009 A | 8/2005 | |
| TW | 200745675 A | 12/2007 | |
| TW | I485490 | 5/2015 | |
| WO | WO 2012/033583 A1 | 3/2012 | |
| WO | WO 2012121398 A1 | 9/2012 | |
| WO | WO 2015/121398 A1 | 8/2015 | |
| WO | WO 2017195833 A1 | 11/2017 | |
| WO | WO 2017199656 A1 | 11/2017 | |
| WO | WO 2017208617 A1 | 12/2017 | |
| WO | WO 2018003380 A1 | 1/2018 | |
| WO | WO 2018164252 A1 | 9/2018 | |
| WO | WO 2019017483 A1 | 1/2019 | |

(56) References Cited

FOREIGN PATENT DOCUMENTS

| | | | |
|---|---|---|---|
| WO | WO 2019055753 | A1 | 3/2019 |
| WO | WO 2019103012 | A1 | 5/2019 |
| WO | WO 2019111763 | A1 | 6/2019 |
| WO | WO 2019131943 | A1 | 7/2019 |
| WO | WO 2019132018 | A1 | 7/2019 |
| WO | WO 2019172437 | A1 | 9/2019 |
| WO | WO 2019189345 | A1 | 10/2019 |
| WO | WO 2020004106 | A1 | 1/2020 |
| WO | WO 2021054099 | A1 | 3/2021 |
| WO | WO 2021060021 | A1 | 4/2021 |
| WO | WO 2021060424 | A1 | 4/2021 |
| WO | WO 2021060432 | A1 | 4/2021 |
| WO | WO 2021060437 | A1 | 4/2021 |
| WO | WO 2021177308 | A1 | 9/2021 |
| WO | WO 2021210359 | A1 | 10/2021 |
| WO | WO 2022/069397 | A1 | 4/2022 |

OTHER PUBLICATIONS

Watanabe, et al., Vertically and Inclinedly Oriented Polarizers for Viewing Angle Control, SID Symposium Digest of Technical Papers, (2021) 52(1) (4 pages).

Zhou et al., Development of Near Zero Optical Retardation Film from Cyclic Block Copolymers, SID Symposium Digest of Technical Papers, (2009) 40(1) (14 pages).

* cited by examiner

BACKLIGHT WITH OPTICAL FILM, ILLUMINATION DEVICE THEREWITH, AND DISPLAY SCREEN

PRIORITY CLAIM

The present application is a National Phase entry of PCT Application No. PCT/EP2024/065261 filed Jun. 4, 2024, which claims priority from German Patent Application No. 10 2023 118 933.6, filed Jul. 18, 2023, the disclosures of which are hereby incorporated by reference herein in their entirety.

FIELD OF THE INVENTION

The invention is directed to a backlight which extends in a planar manner, emits light and has an optical film for controlling and limiting a viewing angle range of a viewer and to the optical film. Such a film comprises a first polarization layer with a first absorption axis, which forms an angle of from 0° to 30°, inclusive, with a surface normal of the optical film, and a second polarization layer with a second absorption axis which is oriented parallel to the surface of the optical film. At least one phase-shifting compensation layer is arranged therebetween for improving the limiting of the viewing angle range. Viewed from the direction of a viewer, either the first polarization layer or the second polarization layer can form the layer closest to the viewer.

BACKGROUND OF THE INVENTION

In recent years, great strides have been made for widening the viewing angle range in LCDs. However, there are often situations in which this very large viewing area of a display screen can be disadvantageous. Increasingly, information such as bank data or other personal information and sensitive data is also available on mobile devices, such as notebooks and tablets. Accordingly, there is a need for controlling viewing access to these sensitive data. It should be possible to choose between a wide viewing angle range or visual angle—a public mode—for sharing information on the display with others, e.g., when viewing vacation photographs or for advertising purposes. On the other hand, there is a need for a small viewing angle range or visual angle—a private mode—when it is desirable to treat the displayed information confidentially.

A similar problem arises in the automotive industry, where the driver should not be distracted by image contents, such as digital entertainment programs, while the engine is running, but the passenger would like to view such images during the drive. Consequently, there is a need for a display screen that can toggle between the corresponding display modes.

Add-on films based on microlouvers have already been used for mobile displays in order to achieve protection of visual data. However, these films were not switchable or toggleable but always had to be manually applied first and then removed again subsequently. They also had to be transported independently from the display when not in use at a particular time. A further substantial drawback in the use of such louver films is tied to the accompanying light losses.

U.S. Pat. No. 6,765,550 B2 describes such a protected view by means of microlouvers. The gravest disadvantage in this case is the mechanical removal and mechanical mounting of the filter and the light losses in protected mode.

U.S. Pat. No. 5,993,940 A describes the use of a film which has small strip-shaped prisms which are uniformly arranged on its surface in order to achieve a private mode, i.e., a limited viewing mode with a small viewing angle range. Development and production are fairly uneconomical in technological respects.

In WO 2012/033583 A1, switching between public view and restricted view is brought about by means of controlling liquid crystals between chromonic layers. There is light loss and the technical expenditure is quite high.

US 2012/0235891 A1 describes a very elaborate backlight in a display screen. According to FIGS. 1 and 15, not only is a plurality of light guides utilized but also additional complex optical elements, such as microlens elements 40 and prism structures 50, which modulate light as it travels from the back illumination to the front illumination. This is expensive and complicated to implement in technical respects and also entails light losses. According to the variant shown in FIG. 17 in US 2012/0235891 A1, both light sources 4R and 18 produce light with a narrow illumination angle. The light from the rear light source 18 is first transformed in a costly manner into light with a large illumination angle. This complex transformation sharply reduces brightness as already noted above.

According to JP 2007-155783 A, special optical surfaces 19 which are difficult to calculate and produce are used to deflect light in different narrow or wide areas depending on the incident angle of light. These structures resemble Fresnel lenses. Further, there are interference edges which deflect light in unwanted directions. Accordingly, it remains unclear whether or not meaningful light distributions can actually be achieved.

US 2013/0308185 A1 describes a special stepped light guide which radiates light onto a large area in various directions depending on the direction from which it is illuminated proceeding from a narrow side. Accordingly, in combination with a transmissive image reproduction device, e.g., an LC display, a display screen can be produced that is switchable between a public viewing mode and a limited viewing mode. One of the drawbacks here consists in that the limited-view effect can only be produced for left and right or up and down, but not for left and right and up and down simultaneously as is needed for certain payment processes, for example. In addition to this, a residual light is also always still visible in the limited-view mode from blocked viewing angles.

Applicant's WO 2015/121398 A1 describes a display screen with two modes of operation in which there are scattering particles in the volume of the corresponding light guide for switching between operating modes. However, the selected scattering particles, which here comprise a polymerizate, generally have the disadvantage that light is coupled out of both large areas so that about one half of the useful light is radiated in the wrong direction, namely, toward the backlight, and cannot be recycled there to a sufficient extent because of the construction. Beyond this, the scattering particles of polymerizate which are distributed in the volume of the light guide can lead under certain circumstances, particularly in high concentrations, to scattering effects which diminish the protected view effect in the protected operating mode.

The technological approach of "electric birefringence" is based on the idea of using the switchable liquid crystals of an additionally applied LC panel to "filter" all of the light rays which do not exit the imaging layer at a determined emission angle. The disadvantages of this technology consist in a high additional expenditure of energy, high cost and the ±40-degree "sweet spot", i.e., best possible viewing position, which is changeable with difficulty. The absorbance of the LC structures is also insufficient because the attenuation of the light intensity increases again for viewing angles in excess of the sweet spot, the light intensity for viewing angles greater than ±400 amounting to as much as 3% of the maximum light intensity.

US 2019/0094626 A1 describes an optical stack for controlling or limiting the viewing angle in which two phase difference plates are arranged on a linear polarizer as compensation layers. Both phase difference plates are λ/4 plates with patterned, optically anisotropic, slat-like or strip-like layers between which a carrier material may be arranged in each instance. They may be identically constructed but differ in their orientation in the final arrangement. The uppermost layer forms a polarization layer, also referred to as "z-polarizer", in which the absorption axes of the transition dipole moments responsible for the polarization are oriented in a direction perpendicular to the layer surface. In a louver-structured layer of this kind, there is always the possibility that visual artifacts such as moiré stripes occur, so that such layers can only ever be utilized for display screens whose characteristics, such as resolution and dimensions, apertures, scatter properties, distance from the screen surface, etc., are known, but cannot be used universally and without regard to screen dimensions.

The methods and arrangements cited above have in common the drawback that they generally reduce the brightness of the basic display screen appreciably and/or require a complicated and costly optical element for toggling between modes and/or lower the resolution in the freely viewable public mode and/or have visual artifacts in very high-resolution displays. A further disadvantage consists in that the limiting of the viewing angle range is not complete; display screen contents can sometimes be discerned with sharply reduced brightness in spite of the viewing angle range supposedly being limited, which can have an annoying effect, for example, during night driving in a motor vehicle.

SUMMARY OF THE INVENTION

It is the object of the invention to develop a backlight with an optical film for controlling and limiting a viewing angle range for a viewer looking at the film—which is generally combined with a display screen—by which the limiting of the viewing angle range is improved so as to make it harder for unauthorized users to catch sight of protected image contents and which accordingly further improves the privacy effect.

For an optical film and a backlight with such an optical film having a layer construction as was briefly described previously, the above-stated object is met by specific configurations of the at least one compensation layer. To begin with, the first polarization layer and the second polarization layer will be described in more detail. The first polarization layer has an absorption axis which forms an angle of from 0° to 30°, inclusive, with a surface normal of the optical film. If the angle is 0°, i.e., the absorption axis is parallel to the surface normal or perpendicular to the film surface, this first polarization layer is a so-called z-polarizer. In the following, the notation "z*-polarizer" will also be used in case of angles diverging from 0° within the above-mentioned range of up to 30°. As a rule, the absorption of the first polarization layer is static, but may also be made switchable so that the angle-dependent absorption can be switched on and off. The second polarization layer has a second absorption axis, and the second absorption axis is oriented parallel to the surface of the optical film. The second polarization layer is thus a conventional linear polarizer. At least one phase-shifting compensation layer is arranged between the first polarization layer and a second polarization layer to improve the limiting of the viewing angle range. The first polarization layer and the second polarization layer may both be arranged closest to a viewer. All of the layers are advisably fixedly connected to one another, for example, bondingly by welding or by optical gluing.

To facilitate understanding and without limiting generality, it will generally be assumed in the following that the surface of the film, in a Cartesian coordinate system defined by an x-direction, a y-direction and a z-direction, lies in a plane lying parallel to an xy-plane defined by the x-direction and the y-direction. Correspondingly, the surface normal lies parallel to the z-direction.

To enhance the privacy effect, i.e., to improve the limiting of the viewing angle range, the at least one phase-shifting compensation layer can be configured in two ways in principle. In a first alternative, also referred to in the following as alternative i., a first B* compensation layer comprising a first biaxially birefringent material is arranged between the first polarization layer and the second polarization layer. A biaxially birefringent material has two optical axes and three principal refractive axes, and a refractive index $n_x$, $n_y$, $n_z$ is uniquely, i.e., bijectively, associated with each of the three principal refractive axes. Depending on the configuration of the first B* compensation layer and the position of the optical axes thereof, either the principal refractive axis to which the lowest refractive index corresponds or the principal refractive axis to which the highest refractive index corresponds lies parallel to the first absorption axis. The first B* compensation layer satisfies the following condition:

$$\Delta ph = \frac{2\pi}{\lambda} d \cdot |n_x - n_y| < 2\pi, \tag{1}$$

where d is the thickness of the first compensation layer, Δph is a phase shift which is caused by the first B* compensation layer, and λ is, in principle, any given wavelength at which the condition is to be met. Accordingly, an upper limit is defined for the phase retardation of the B* compensation layer which accordingly also indirectly determines a maximum thickness.

Conversely, in a second alternative, also referred to in the following as alternative ii., at least two compensation layers comprising uniaxially birefringent materials are arranged between the first polarization layer and the second polarization layer. A first, spatially homogeneous A* compensation layer comprises a first uniaxially birefringent material with a first optical axis and two first principal refractive axes differing from one another, and the first optical axis which coincides with one of the first principal refractive axes lies perpendicular to or parallel to the first absorption axis of the first polarization layer. Behind this, viewed from the direction of a viewer, is arranged a second, spatially homogeneous A* compensation layer which comprises a second uniaxially birefringent material with a second optical axis and two second principal refractive axes, and the second optical axis of the second material which coincides with one of the second principal refractive axes lies perpendicular to the first optical axis of the first material. The optical axes of the uniaxial materials are also referred to as extraordinary axes.

By "spatially homogeneous" is meant that the respective compensation layer has no patterning within it or over the area parallel to the surface of the optical film and therefore exhibits the same behavior over the entire area, unlike in US 2019/0094626 A1, for example. In order to prevent the occurrence of moiré stripes in layer bodies with such slat-like patterning, the layer construction as embodied in US 2019/0094626 A1 must be specifically adapted to the resolution, distances, apertures, surfaces and scatter properties for each configuration, which renders production costly. In contrast, the optical films according to the invention with the spatially homogeneous compensation layers can be used universally for different display screen sizes and display screen resolutions without having to be specially adapted thereto.

Each of the two A* compensation layers satisfies the following condition:

$$\Delta ph = \frac{2\pi}{\lambda} d \cdot |n_e - n_o| < 2\pi, \tag{2}$$

where d is the thickness of the respective A* compensation layer, $n_e$ is the extraordinary refractive index, and $n_o$ is the ordinary refractive index. Δph designates a phase shift which is caused by the first or second A* compensation layer individually, and λ is, in principle, any given wavelength at which the condition is to be met.

In both alternatives, the materials and the thicknesses d of the compensation layers are specified such that—measured in a spherical coordinate system having its origin on the surface of the film and in the plane of the film—the luminance is minimal exclusively in a specified solid angle range R. The solid angle range R comprises only a portion of the possible perceptible half-space, namely, for one, azimuthal angles φ for which |φ| or |180°−φ| is less than the amount of a predeterminable limiting azimuthal angle $\varphi_{lim}$ measured in relation to a preferential direction in the plane of the surface of the film. The choice of preferential direction is optional in principle but is made depending on the use of the optical film. If this optical film is used, for example, in a display screen with fixed orientation as in a vehicle, the preferential direction is selected in such a way that it runs parallel to an imaginary line between the eyes of a driver sitting upright, i.e., generally horizontally.

On the other hand, the solid angle range for which the luminance is minimal comprises polar angles θ of a greater magnitude than a predetermined limiting polar angle $\theta_{lim}$ generally measured in relation to the first absorption axis and in a plane which is defined by the surface normal and the first absorption axis whose vectors have a common origin, i.e., all solid angles outside of a cone with the limiting polar angle $\theta_{lim}$ around the first absorption axis which in this respect becomes the "zero axis". Insofar as the surface normal and the first absorption axis are parallel to one another, the polar angle is measured only with reference to the surface normal. If the optical film is used in a display screen as previously described by way of example, the optical film effectively operates in a view-limiting manner, since the luminance is minimal in the above-mentioned solid angle range. Therefore, in the ideal case, a viewer situated in a position located within the above-mentioned solid angle range with reference to the spherical coordinate system of the optical film does not perceive any contents on the display screen due to the minimal luminance in this range. The expression "minimal luminance" means that the luminance is virtually zero, and the luminance drops so steeply relative to the luminance outside of the above-mentioned solid angle range that a viewer ideally cannot perceive any image contents.

To define the solid angle range even more sharply, i.e., to achieve an even sharper decrease in the luminance inside of the solid angle range compared with the luminance outside of the solid angle range, it is advantageous that, in the second alternative ii, there is arranged between the first A* compensation layer and the second A* compensation layer a third, spatially homogeneous C* compensation layer which is formed of a third uniaxially birefringent material with a third optical axis and two third principal refractive axes, the third optical axis lying parallel to the first absorption axis of the first polarization layer.

For a symmetrical decrease in luminance with respect to the surface of the film, it is advisable when the first absorption axis is oriented perpendicular to the surface of the film. When the optical film is used in a display screen, as was previously described, then, depending on a change in the viewing angle toward the right side or left side or along the preferential direction, a viewer looking at the display screen along the surface normal of the display screen experiences a symmetrical decrease in luminance on both sides, i.e. depending only on the amount of the polar angle. The limiting polar angle $\theta_{lim}$ is then measured with reference to the surface normal and, therefore, in contrast to measuring with reference to the first absorption axis, is identical for all azimuthal angles.

When the first absorption axis is oriented in this way, the first polarization layer is also referred to as z-polarization layer. When positions of the first absorption axis diverge from this in the range previously described, the first polarization layer is referred to as z*-polarization layer; that is, the use of the symbol "*" here denotes a generalization of the z-polarization layer.

Similarly, the designation "A* compensation layer" represents a generalization of the term "A compensation layer", and the designation "B* compensation layer" represents a generalization of the term "B compensation layer". The definitions of the terms "z-polarization layer", "A compensation layer" and "B compensation layer" which are generally known from the prior art are based on the article "Optical anisotropy conversion of retarder film made of rodlike and crosslike reactive molecules, and its dependence on the relative ratio and the orientation of the constituent molecules", Ho-Jin Choi, et al., published online in *Optical Materials* 99 (2020), Article ID 109531.

If the first absorption axis is oriented perpendicular to the surface of the film, i.e., the first polarization layer is formed as z-polarization layer, there are several advisable configurations: two configurations for the first alternative and a third configuration for the second alternative. As a general rule, the orientations of the optical axes of the compensation layers must be oriented to the orientation of the first absorption axis of the first polarization layer in order to achieve the desired limiting of the viewing area. Another position of the first absorption axis may be advantageous, for example, when the viewer, for example, the driver of a vehicle, views the display screen from an oblique angle rather than along the surface normal.

In a first configuration according to the first alternative in which the first absorption axis of the first polarization layer is oriented perpendicular to the surface of the optical film and the principal refractive axis to which the lowest refractive index corresponds lies parallel to the first absorption axis, the first B* compensation layer is formed as −B compensation layer. The optical axes lie in a plane defined by the x-direction and the z-direction, and the three principal refractive axes correspond to the directions of the Cartesian coordinate system, where $n_x>n_y>n_z$, and $n_x$ lies parallel to the second absorption axis of the second polarization layer. This latter condition also applies at small inclinations of the first absorption axis of up to approximately 10° with reference to the surface normal. Apart from that, the principal refractive axes are likewise inclined, and the position of the coordinate system in x, y and z is oriented to the position of the first absorption axis which corresponds to the z-direction of the coordinate system, where it is crucial that $n_x$ lies perpendicular to the first absorption axis.

In a second configuration according to the first alternative in which the first absorption axis of the first polarization layer is oriented perpendicular to the surface of the optical film and the principal refractive axis to which the highest refractive index corresponds lies parallel to the first absorption axis, the first B* compensation layer is formed as +B compensation layer. The optical axes lie in a plane defined by the y-direction and z-direction, and the three principal refractive axes correspond to the directions of the Cartesian coordinate system, where $n_z>n_x>n_y$, and $n_y$ lies parallel to the second absorption axis of the second polarization layer. This latter condition also applies at small inclinations of the first absorption axis of up to approximately 100 with reference to the surface normal. Other than that, the principal refractive axes are likewise inclined and the position of the coordinate system in x, y and z is oriented to the position of the first absorption axis which corresponds to the z-direction of the coordinate system, where it is crucial that $n_y$ lies perpendicular to the first absorption axis.

In a third configuration according to the second alternative in which the first absorption axis of the first polarization layer (1) is also oriented perpendicular to the surface of the optical film, the first A* compensation layer is formed as +A compensation layer, and the second A* compensation layer is formed as −A compensation layer, or vice versa. When there is a third, "C*" compensation layer, it is formed as −C compensation layer or +C compensation layer.

In order to keep manufacturing costs low, it is advantageous when the first A* compensation layer and second A* compensation layer are formed identically, i.e., both compensation layers are formed either as +A compensation layer or as −A compensation layer and have the same thickness.

In a particularly preferred further development, a liquid crystal layer which is switchable between at least two states can be arranged in all of the above-mentioned configurations between the second polarization layer and that compensation layer arranged closest to the second polarization layer. This switchable liquid crystal layer is configured such that light transmitted by the second polarization layer is transmitted by the switchable liquid crystal layer with unchanged linear polarization or with linear polarization rotated by 90° in a first switching state and with circular or elliptical or linear polarization in a second switching state. In the first switching state, the 90-degree rotation is understood to mean that linearly polarized light becomes linearly or elliptically polarized light after passing through the switchable liquid crystal layer, a majority of the vectors of the electric field being rotated by 90°. Accordingly, an exact 90-degree rotation of polarization does not take place. The addition of the switchable liquid crystal layer makes it possible to switch between a private mode and a public mode, which makes itself noticeable when the optical film is integrated in a display screen. Whereas the above-described drop in luminance in the specified solid angle range is permanent for the optical film, it may be canceled through the use of the switchable liquid crystal layer. The first switching state corresponds to the private mode. The light remains linearly polarized. The second switching state corresponds to the public mode in which the light is generally elliptically polarized but may also be polarized differently depending on the choice of liquid crystal layer. In the public mode, there is only a slight drop, if any, in luminance in the specified solid angle range so that, within the confines of technical possibilities, image contents are visible regardless of the position of the viewer, i.e., unrestrictedly, when the arrangement is used in a display screen. On the other hand, in the private mode, image contents are no longer visible by persons positioned at the side—with reference to the direction of the first absorption axis. Alternatively, the liquid crystal layer can also be arranged between the first polarization layer and the compensation layer arranged closest to the latter.

The switchable liquid crystal layer is generally used in conjunction with a static first polarization layer to produce a switchable optical film. However, the switchable liquid crystal layer may also be dispensed with if its function can be performed by means of a switchable first polarization layer. In this case, the first polarization layer may be configured, for example, as a liquid crystal layer in which dyes, known as dye LC cells, are incorporated. The latter are suitable particularly when the first absorption axis, i.e., the absorption axis of the first polarization layer, is parallel to the surface normal of the optical film.

The view-limiting effect in the specified solid angle range, i.e., the decrease in luminance to the minimum in this solid angle range, can preferably be achieved in that the individual components of the optical film are so adapted to one another that the loss function $$C_2 = \int_R \ln T(\phi, \theta) d\Omega$$

is minimal in the specified solid angle range R, where T (φ, θ) is the angle-dependent transmission and Ω denotes the solid angle. Accordingly, the natural logarithm of the angle-resolved transmission is calculated and integrated over the solid angle range in which the protected view is to be optimized. The logarithm represents a weighting so that transmissions can be incorporated into the optimization over different orders of magnitude. Other weightings are also contemplated, for example, a linear weighting. In this regard, application of the logarithm to the transmission is omitted. Commercially available optics design programs, for example, LCD MASTER® by Uniglobe Kisco, Inc. or Tecwiz LCD 3D® by INCROPS, may be utilized as a basis for adapting the components to one another while meeting this condition and can be adapted for the optics design according to the invention.

For most applications, it has proven advisable when the limiting azimuthal angle $\varphi_{lim}$ is between 30° and 40° around a preferential direction and/or the limiting polar angle $\theta_{lim}$ is between 40° and 50° relative to the surface normal or to the direction of the first absorption axis in case the latter is inclined relative to the surface normal.

The above-described backlight with the optical filter can be integrated in an illumination device for a display screen provided the film is not outfitted with a switchable liquid crystal layer such as that previously described and in a display screen when it is outfitted with a switchable liquid crystal layer.

Specifically, the backlight with the non-switchable optical film, i.e., not provided with a switchable liquid crystal layer, can be inserted and therefore utilized in an illumination device for a transmissive display screen, particularly an LCD display, this illumination device being configured such that it can be operated in two operating modes, operating mode B1 for a free viewing mode and operating mode B2 for a limited viewing mode in which light is emitted in a solid angle range which is limited compared to the free viewing mode. This illumination device comprises a backlight, which extends in a planar manner and which has backlight sources, and a non-switchable optical film such as that described above and emits light. When the second polarization layer of the optical film is arranged in front of the first polarization layer considered in viewing direction, it is generally true for the backlight, also in other configurations to be described later, that the backlight sources of the backlight emit unpolarized light; in the reverse arrangement, the light emitted by the backlight sources of the backlight can also be (partially) polarized. A plate-shaped light guide with two large surfaces and narrow surfaces connecting the latter is arranged in front of the backlight in a viewing direction for a viewer looking at the illumination direction and has outcoupling elements on at least one of the large surfaces and/or within its volume. Illuminants are arranged laterally at least at one narrow side of the light guide. A linear polarization filter is arranged in front of the backlight or in front of the light guide in viewing direction. This polarization filter may optionally correspond to the second polarization layer of the optical film but can also be formed separately. In this way, light which emerges from the backlight and passes through the linear polarization filter can be limited with respect to its propagation directions. In so doing, the backlight is switched on and the illuminant is switched off in operating mode B2 for the limited private mode. Only the backlight emits light in the limited viewing angle range. In operating mode B1 for the free or public viewing mode, at least the illuminants are switched on so that the limited illumination can be compensated or overcompensated solely by means of the backlight. Correspondingly, the backlight can be switched on or switched off in the public mode. In this case, the transmissive display screen is arranged in front of the illumination device.

The invention also comprises a display screen which can be operated in at least two operating modes, operating mode B1 for a free viewing mode and operating mode B2 for a limited viewing mode in which light is emitted in a viewing angle range or solid angle range that is limited for a viewer compared to the free viewing mode. Such a display screen comprises a light-emitting backlight extending in a planar manner with an optical film as described above in the configuration with a switchable liquid crystal layer which is switchable between two states. Optionally, the backlight can be formed to be directly lighting, for example, as a direct matrix backlight. A linear polarization filter is arranged in front of the backlight in viewing direction. Optionally, this linear polarization filter can also correspond to the second polarization layer of the optical film. In this way, light emanating from the backlight and passing through the linear polarization filter is limited with respect to its propagation directions. A transmissive image reproduction device is arranged in front of the backlight in viewing direction. The linear polarization filter may be part of the image reproduction device and is then arranged in the transmissive image reproduction device. However, it can also be constructed separately and is then arranged in the stack of optical elements as close as possible to the image reproduction device. A typical image reproduction device has a linear polarizer, respectively, above and below a LC layer in viewing direction. The previous remarks relate here to the linear polarizer arranged below in viewing direction. The linear polarizer arranged above is crucial for the private viewing application. The liquid crystal layer which is switchable between at least two states is in the first switching state in operating mode B2 and in the second switching state in operating mode B2 as described above.

Finally, the invention also comprises a further display screen which can be operated in at least two operating modes, operating mode B1 for a free viewing mode and operating mode B2 for a limited viewing mode in which light is emitted in a viewing angle range or solid angle range that is limited for a viewer relative to the free viewing mode. Such a display screen comprises an image reproduction device, for example, an OLED, micro-LED or LCD type image reproduction device, and an optical film which is arranged in front of the image reproduction device in viewing direction and which has the previously described liquid crystal layer which is switchable between at least two states. This liquid crystal layer is in the first switching state in operating mode B2 and in the second switching state in operating mode B2 in accordance with the above definitions of the first switching state and second switching state.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. These embodiment examples are provided merely to be illustrative and should not be considered as restrictive. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated. Modifications and alterations which are described for one of the embodiment examples may also be applicable to other embodiment examples. Like or comparable elements in the various figures are designated by the same reference numerals and not mentioned repeatedly so as to prevent repetition. The drawings show.

DETAILED DESCRIPTION OF THE DRAWINGS

Figure 1A:
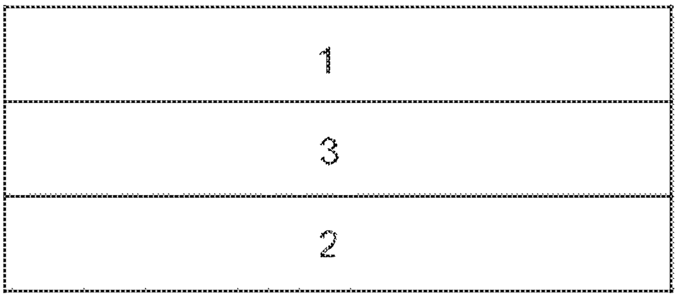
FIGS. 1A-1C various layer constructions of an optical film for controlling and limiting the viewing angle range of a viewer.
Figure 1B:
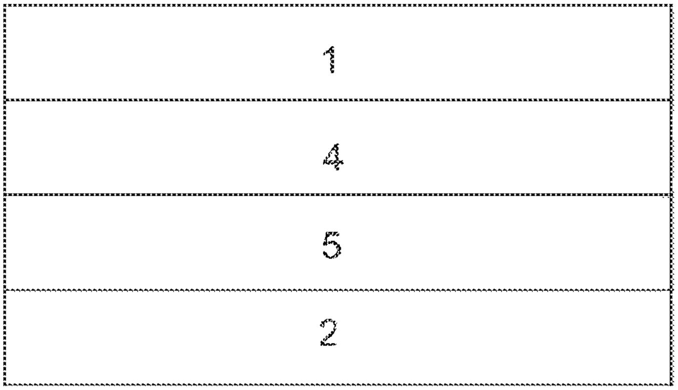
Figure 1C:
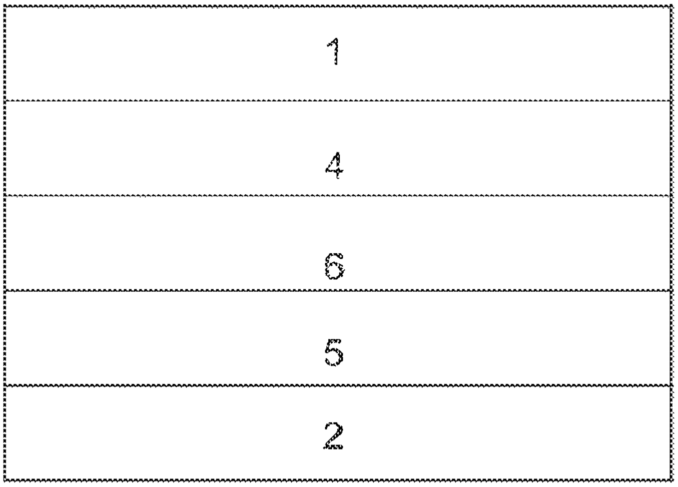

FIGS. 1A-1C show various schematic diagrams of a layer construction of an optical film for controlling and limiting a viewing angle range of a viewer. The viewer, not shown, is situated above the uppermost layer which has a surface with a surface normal which, in this case, extends in the drawing plane parallel to the longer edge of the drawing sheet. Viewed from the direction of the viewer, the uppermost layer is a first polarization layer 1 in all three diagrams in FIGS. 1A-1C. The first polarization layer 1 has a first absorption axis which forms an angle of from 0° to 30° with the surface normal of the optical film. When the angle is 0°, the first polarization layer 1 is a z-polarizer, while the term "z*-polarizer" is used for angles diverging therefrom. An angle of 0° is ideal for notebooks, for example, where the user is situated directly in front of the display screen. An angle of 30° may be advantageous in a motor vehicle, for example, where the display screen is arranged centrally between the driver's seat and the front passenger seat in order possibly to have information visible only to the driver.

The bottommost layer in FIGS. 1A-1C is a second polarization layer 2 with a second absorption axis oriented parallel to the surface of the optical film. Accordingly, the second polarization layer 2 is a linear polarizer.

At least one phase-shifting compensation layer is arranged between the first polarization layer 1 and the second polarization layer 2 for improved limiting of the viewing angle range. An individual compensation layer is used or a plurality of compensation layers are used depending on the type of compensation layer. The compensation layers are uniaxially or biaxially birefringent polymer films, for example. The layers are advisedly fixedly connected to one another, for example, by optical gluing or other bonding connections. Connecting by ultrasonic welding is also contemplated, for example. Connecting by adhesion alone while laying or pressing extremely smooth surfaces onto one another, possibly with an anti-reflective coating, is also contemplated. To improve the protected view effect, there are various possibilities, to be described in the following, for realizing a compensation layer or a plurality of compensation layers. As an alternative, not shown in the drawing, the second polarization layer 2 can also be arranged as uppermost layer in viewing direction, with the first polarization layer 1 behind it; however, the at least one phase-shifting compensation layer is always located between the first polarization layer 1 and the second polarization layer 2.

In a first embodiment shown in FIG. 1A and also referred to in the following as first alternative or alternative i., a first B* compensation layer 3 is arranged between the first polarization layer 1 and the second polarization layer 2. The first B* compensation layer 3 is a spatially homogeneous layer comprising a biaxially birefringent material. Accordingly, the material or first B* compensation layer 3 has two optical axes and three principal refractive axes. A refractive index $n_x$, $n_y$, $n_z$ is uniquely associated with each of the three principal refractive axes. These are typical properties of a biaxially birefringent material. Indices "x", "y" and "z" correspond to the axes of a Cartesian coordinate system. However, for realizing a protected view effect it is key that either the principal refractive axis to which the lowest refractive index corresponds or the principal refractive axis to which the highest refractive index corresponds lies parallel to the first absorption axis.

The position of the first absorption axis determines the positions of all of the other absorption axes or principal refractive axes of all types of compensation layers. When the first polarization layer is a z-polarizer, for example, whose first absorption axis accordingly lies parallel to the surface normal or perpendicular to the surface of the film, this means that the corresponding principal refractive axis to which the lowest or highest refractive index corresponds also lies parallel to the surface normal. Correspondingly, the other two principal refractive axes then lie in the plane of the surface of the optical film. The optical axes of the first B* compensation layer 3 which, in this case, is a B compensation layer then lie in a plane which perpendicularly intersects the surface of the optical film. In this case, the first B* compensation layer 3 can be configured in two different ways.

On the one hand, it can be formed as a −B compensation layer. Since it is a z-polarizer in this case, the z-direction is associated with the direction perpendicular to the surface of the optical film in a notional Cartesian coordinate system in which the principal refractive axes and the optical axes of the B* compensation layer are defined. In this notation, the −B compensation layer satisfies the condition $n_x>n_y>n_z$. The lowest refractive index that corresponds to the principal axis perpendicular to the surface of the optical film is therefore designated by $n_z$. Further, the principal refractive axis to which the highest refractive index $n_x$ corresponds lies parallel to the second absorption axis of the second polarization layer 2.

On the other hand, it can be formed as a +B compensation layer. Here also, the z-direction is associated with the direction perpendicular to the surface of the optical film. In this notation, the +B compensation layer satisfies the condition $n_z>n_x>n_y$. The highest refractive index that corresponds to the principal axis lying perpendicular to the surface of the optical film is therefore designated by $n_z$. Further, the principal refractive axis to which the lowest refractive index $n_y$ corresponds lies parallel to the second absorption axis of the second polarization layer 2 (see above).

For all of the embodiments of the first alternative, the first B* compensation layer 3 satisfies the condition:

$$\Delta ph = \frac{2\pi}{\lambda} d \cdot |n_x - n_y| < 2\pi,$$

where d is the thickness of the first B* compensation layer 3, Δph is a phase shift which is caused by the first compensation layer, and λ is, in principle, any wavelength at which the condition is to be met. Accordingly, an upper limit is defined for the phase retardation of the B* compensation layer 3 which accordingly also indirectly determines a maximum thickness.

In a second embodiment whose basic construction is illustrated in FIG. 1B and which is also referred to in the following as second alternative or alternative ii., at least two compensation layers, a first A* compensation layer 4 and a second A* compensation layer 5, comprising uniaxially birefringent materials are arranged between the first polarization layer 1 and the second polarization layer 2. Both A* compensation layers 4, 5 are formed to be spatially homogeneous in the sense defined previously. The first A* compensation layer 4 comprises a first uniaxially birefringent material with a first optical axis and two first principal refractive axes. The first optical axis lies perpendicular to or parallel to the first absorption axis of the first polarization layer 1. Behind this, viewed from the direction of a viewer, is arranged the second A* compensation layer 5 which comprises a second uniaxially birefringent material with a second optical axis and two second principal refractive axes. The position of the second optical axis of the second A* compensation layer 5 is determined depending on the position of the first optical axis of the first A* compensation layer 4 in that the condition that the second optical axis lies perpendicular to the first optical axis must be met. Each of the two A* compensation layers 4, 5 meets the following condition:

$$\Delta ph = \frac{2\pi}{\lambda} d \cdot |n_e - n_o| < 2\pi,$$

where d is the thickness of the respective compensation layer, $n_e$ is the extraordinary refractive index, and $n_o$ is the ordinary refractive index. Δph designates a phase shift which is caused by the first or second A* compensation layer 4, 5 individually, and λ is, in principle, any wavelength at which the condition is to be met. Both A* compensation layers 4, 5 can comprise the same material and/or can have the same thickness, which facilitates production.

FIG. 1C shows a further development of the second alternative. In order to define the solid angle range more sharply, i.e., to achieve an even steeper decline in of the luminance inside of the aforementioned solid angle range compared with the luminance outside of the solid angle range and/or a greater flexibility in the choice of components for the compensation layers, it is advantageous in the second alternative when there is arranged between the first A* compensation layer and the second A* compensation layer a third, "C*" compensation layer 6 which is in turn likewise spatially homogeneous. The third C* compensation layer 6 is formed of a third uniaxially birefringent material with a third optical axis and two third principal refractive axes, the third optical axis lying parallel to the first absorption axis of the first polarization layer 1. Here also, the position of the first absorption axis of the first polarization layer 1 determines the position of the optical axis of the material of the third C* compensation layer 6.

As long as the first polarization layer 1 is configured as a z-polarizer and the first absorption axis is accordingly oriented perpendicular to the surface of the film, either the first A* compensation layer 4 is formed as +A compensation layer and the second A* compensation layer 5 is formed as −A compensation layer, or vice versa. When there is a third C* compensation layer 6, it is formed as −C compensation layer or +C compensation layer.

In both the first and second alternatives, the materials and the thicknesses d of the compensation layers are specified such that—with reference to a spherical coordinate system having its origin on the surface of the film and in the plane of the film—the luminance is minimal exclusively in a specified solid angle range R. The solid angle range R comprises only part of the possible perceivable half-space, namely, for one, azimuthal angles φ lying in the surface of the film for which |φ| or |180°−φ| is less than the amount of a predeterminable limiting azimuthal angle $\varphi_{lim}$ measured with reference to a preferential direction in the plane of the surface of the film. The choice of the preferential direction is optional in principle but is made depending on the use of the optical film. If this optical film is used, for example, in a display screen with fixed orientation, such as in a vehicle, the preferential direction is selected in such a way that it runs parallel to an imaginary line connecting the eyes of a driver sitting upright, i.e., generally horizontally. The limiting azimuthal angle $\varphi_{lim}$ is specified depending on the application for which the film is intended. Values between 30° and 40° around the preferential direction are typical, for example, for notebooks which are to be protected against viewing from the side in trains, etc. In this case, the preferential direction generally runs parallel to the longer edge of the display screen and the first absorption axis runs parallel to the normal of the display screen so that the decrease in luminance is symmetrical on all sides.

On the other hand, the solid angle range for which the luminance is minimal comprises polar angles θ of a greater magnitude than a predetermined limiting polar angle $\theta_{lim}$ measured with reference to the first absorption axis and in a plane which is defined by the surface normal and the first absorption axis, or measured only with reference to the surface normal in case the first absorption axis is parallel to the latter. The limiting polar angle $\theta_{lim}$ is preferably between 40° and 50° depending on the application. If the optical film is used in a display screen as was previously described by way of example, the optical film acts so as to effectively operate in a view-limiting manner, since the luminance is minimal in the above-mentioned solid angle range. Therefore, ideally, a viewer situated in a position located within the above-mentioned solid angle range with reference to the spherical coordinate system of the optical film does not see, or at least cannot recognize, any contents on the display screen because of the minimal luminance in this range.

The view-limiting effect in the specified solid angle range, i.e., the decrease in luminance to the minimum in this solid angle range, can preferably be achieved in that the individual components of the optical film are so adapted to one another that the loss function $C_2=\int_R \ln T(\varphi, \theta)\, d\Omega$ is minimal in the specified solid angle range R, where T (φ, θ) is the angle-dependent transmission and Ω denotes the solid angle range. Accordingly, the natural logarithm of the angle-resolved transmission is calculated and integrated over the solid angle range in which the protected view is to be optimized. In this way, not only are viewing angles lying on the horizontal included but also viewing angles which deviate from the vertical viewing direction of 0°—along the surface normal—of the authorized viewer, i.e., up or down. This includes, for example, third viewers situated on the sides next to the sitting user of the device in the protected viewing mode. As a result, a protected view which is greatly improved over the prior art is also obtained for these viewing angles. A weighting over various orders of magnitude is carried out by the logarithm, but a linear weighting or other weightings are also contemplated, for example.

Figure 2:
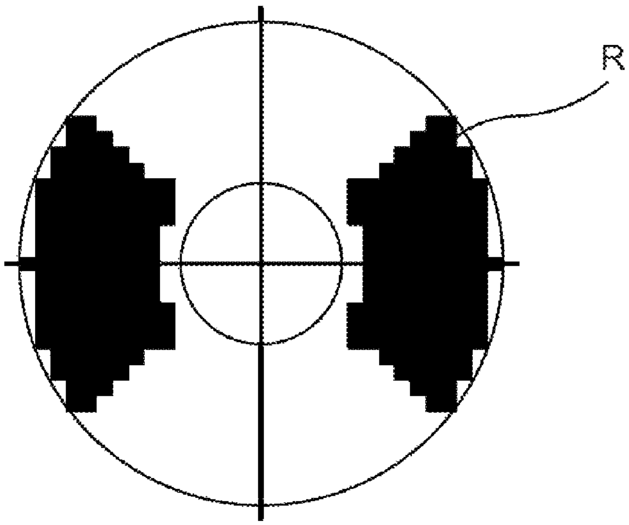
FIG. 2 limiting of the viewing angle range.
Figure 3:
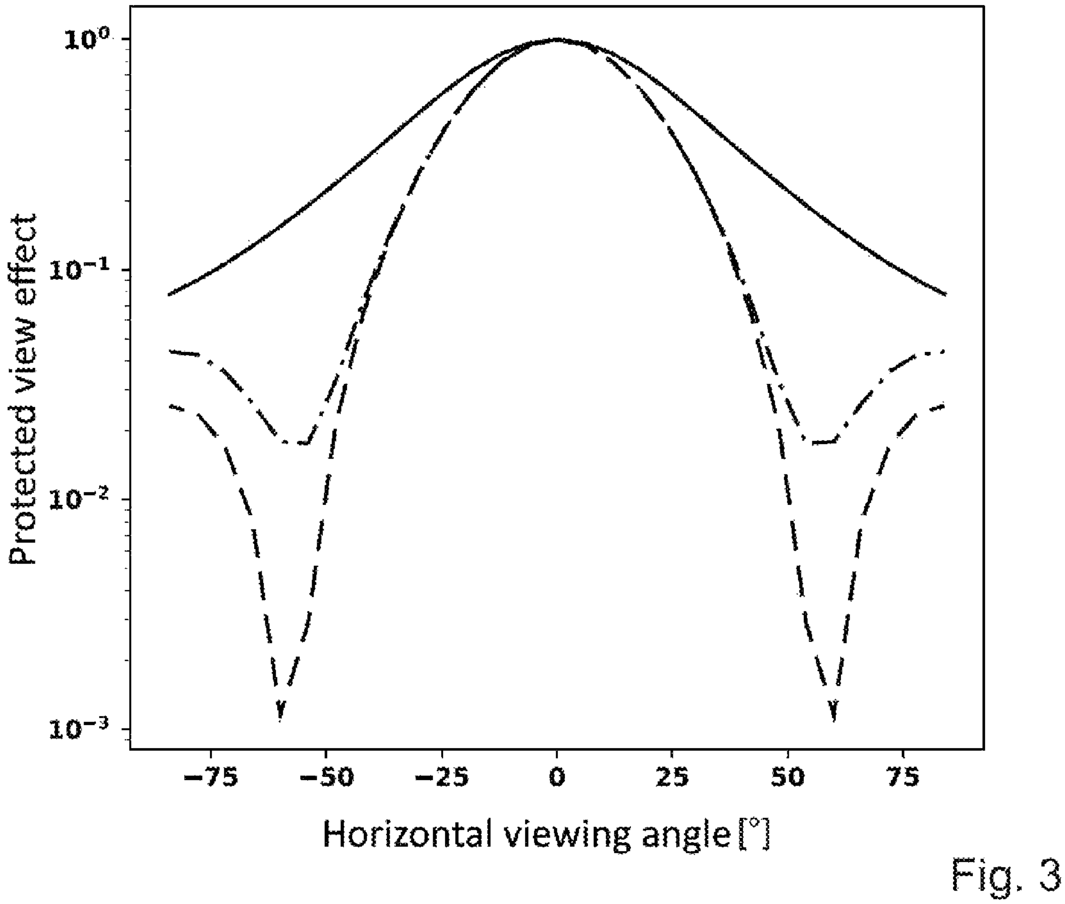
FIG. 3 an example for the improvement of the protected view by means of the invention.

This is illustrated by way of example referring to FIGS. 2 and 3. FIG. 2 shows a projection of a specified solid angle range R in the plane of the optical film as dark surfaces, also known as a conoscopic image. In this region, the protected view is to be improved so that the luminance is as low as possible therein. The solid angle range R in this example is specified such that the limiting azimuthal angle $\varphi_{lim}$ is 40°—in this way, the dark surfaces occur above and below the horizontal axis—and the limiting polar angle $\theta_{lim}$ is likewise 40°—this corresponds to the regions cut out to the right and left of the center point. The inner concentric circle corresponds to a polar angle of θ=40°. The loss function, i.e., the integral of the logarithmic transmission, is minimized for this specified solid angle range. Commercial optics design programs such as those previously mentioned by way of example can be used for adapting the components to one another while satisfying this condition.

As result, a protected view effect which is improved toward the side is also obtained for vertical viewing angles which deviate from 0°—corresponding to a perpendicular view on the surface of the optical film—as is shown by way of example in FIG. 3 for a vertical viewing angle of 30° and an optical film according to the second alternative with a +A compensation layer and a −A compensation layer on the one hand and with a further −C compensation layer on the other hand. The first polarization layer 1 is formed as a z-polarizer so that the first absorption axis lies parallel to the surface normal of the optical film. The drawing shows the protected view effect in arbitrary units, i.e., the luminance is scaled to an angle of 0°, depending on the horizontal viewing angle in degrees, from which the brightness level of the display screen can be deduced in the view-protected angle range compared with the angle range in which viewing is not protected. The preferential direction was chosen, by way of example, parallel to the horizontal direction, which refers to a reference system of a viewer, i.e., the horizontal direction corresponds to an imaginary line connecting the eyes of the viewer, and the vertical direction is correspondingly perpendicular thereto. The solid line corresponds to a protected view effect such as can be achieved in the prior art only with a z-polarizer and without spatially homogeneous compensation layers at a vertical viewing angle of 30°. The dashed line shows the protected view effect when two A* compensation layers of types −A and +A are combined, and the dash-dot line shows the protected view effect when a −C compensation layer is additionally combined. Since the A* compensation layers have not been completely optimized in this example, no improvement is shown for the combination with the −C compensation layer in this example. However, an improved protected view is typically obtained at angles around 30° when C* compensation layers are used. The improved protected view toward the sides is clearly noticeable up to angles of about 60°. The protected view at very large angles of more than 60°, which is lower but still improved over the prior art, is exaggerated in the drawing because of the logarithmic scale but is not noticeable in practice. At a vertical viewing angle of 0°, not shown here, an optical film according to the prior art and an optical film with additional compensation layers, which has been described above and will be described in the following, deliver approximately the same results roughly corresponding to the dashed curve or dash-dot curve.

The solid angle range R shown in FIG. 2 is to be considered only as exemplary and may be adapted as needed in order, for example, to also improve the protected view relative to vertical viewing angles at which the horizontal viewing angle is 0°, using the example of a notebook corresponding to viewers standing directly behind a sitting user. In this case, for example, the dark solid angle range from FIG. 2 would completely surround the concentric circle at 40°.

Figure 4A:
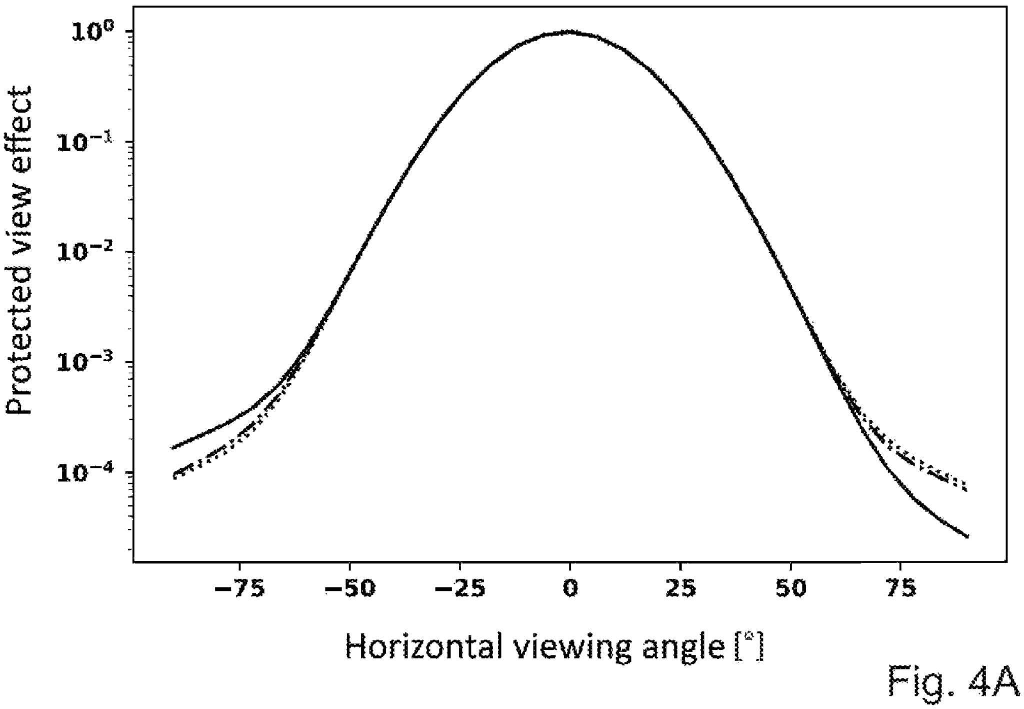
FIGS. 4A-4B the protected view effect for a first embodiment of the optical film.
Figure 4B:
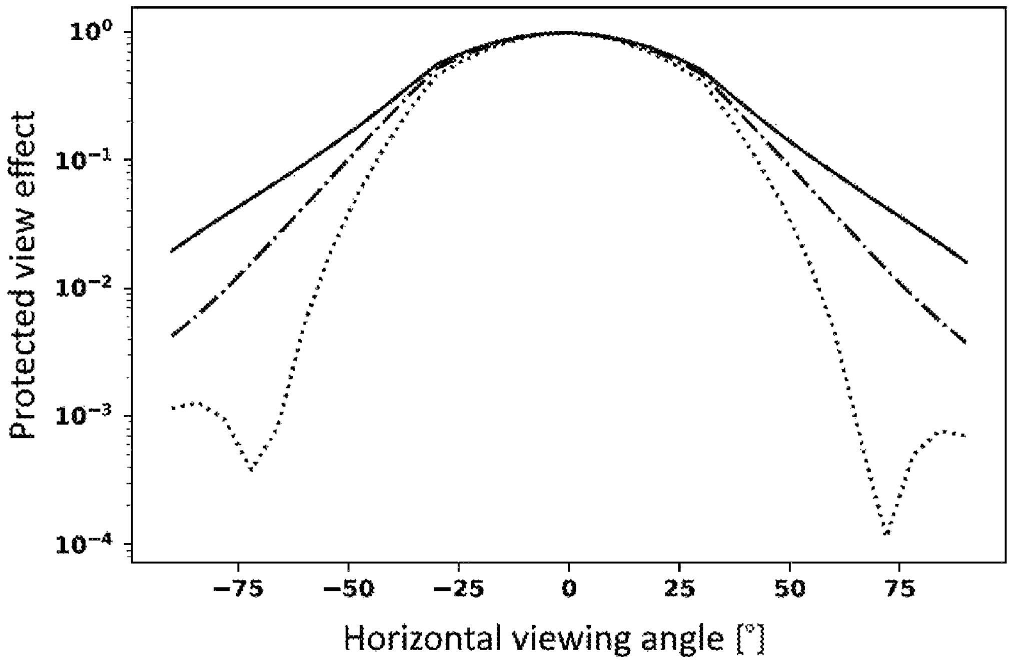
Figure 5A:
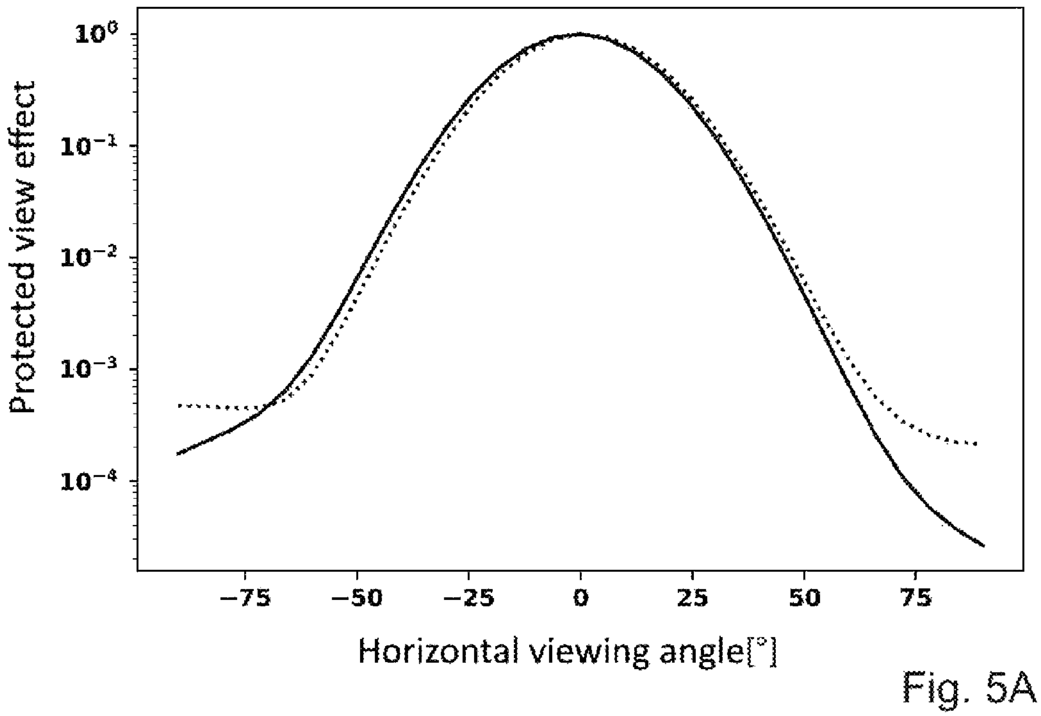
FIGS. 5A-5B the protected view effect for a second embodiment of the optical film.
Figure 5B:
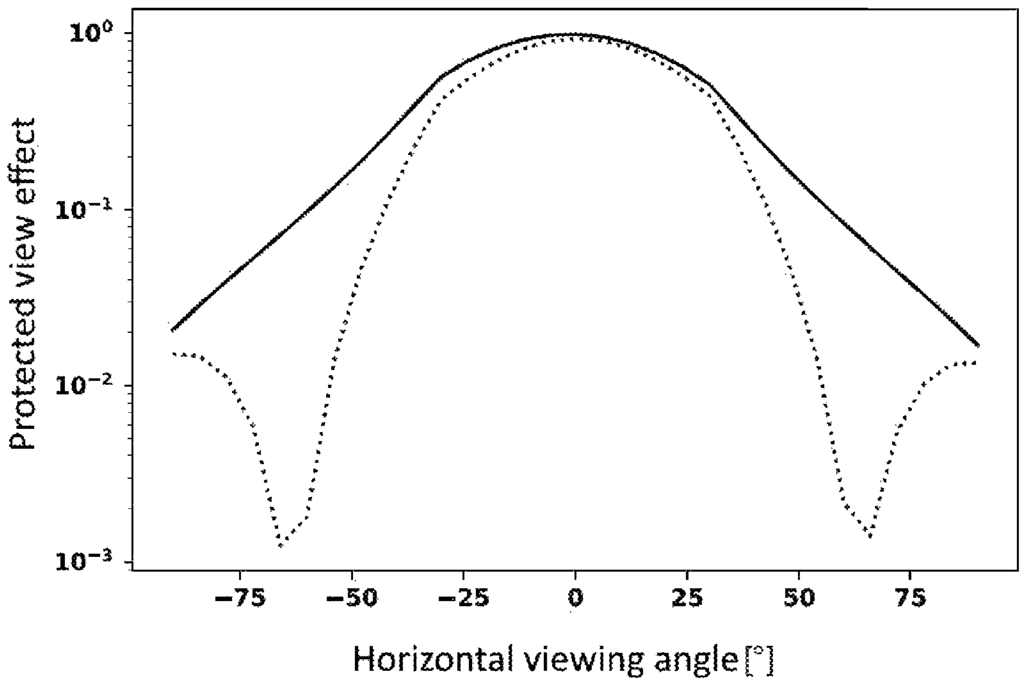
Figure 6A:
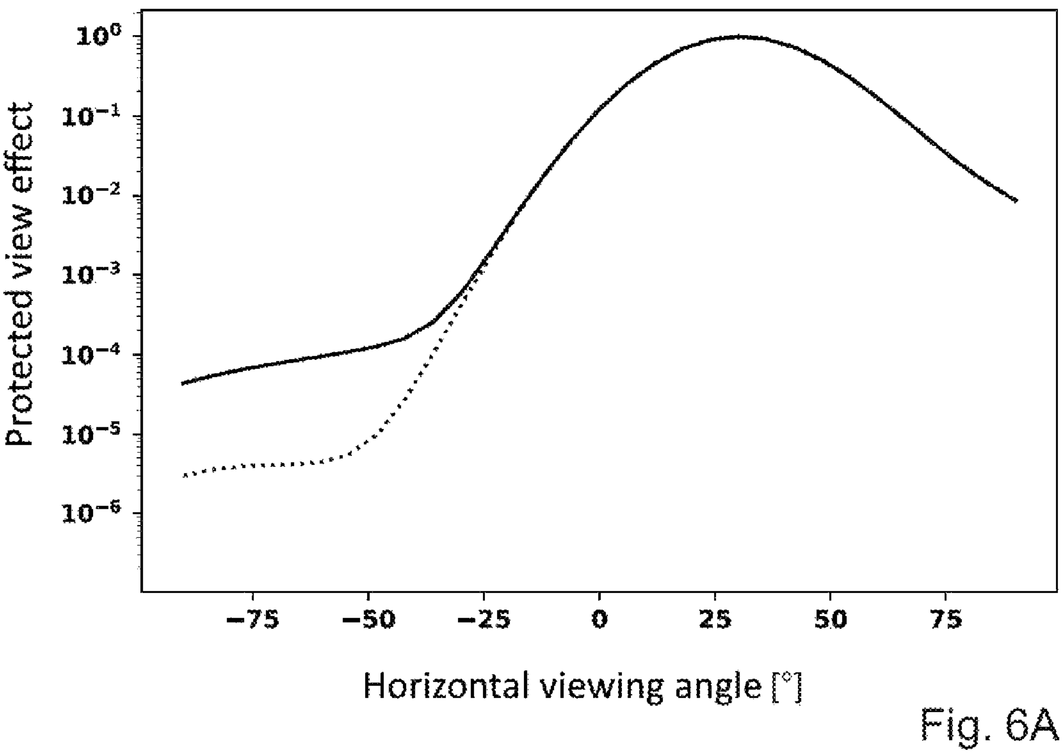
FIGS. 6A-6B the protected view effect for a third embodiment of the optical film.

Further examples are shown in FIGS. 4A-4B, FIGS. 5A-5B and FIGS. 6A-6B, wherein the solid angle range R is specified in accordance with FIG. 2. FIG. 4A, FIG. 5A and FIG. 6A show the protected view effect for a vertical viewing angle of 0°, and FIG. 4B, FIG. 5B and FIG. 6B each show the protected view effect for a vertical viewing angle of 30°. The solid curves always correspond to the optical film with only a first z*-polarization layer without additional, spatially homogeneous compensation layers.

FIG. 4A and FIG. 4B show the protected view effect for an optical film constructed in accordance with the first alternative shown in FIG. 1A with a first B compensation layer 3. Since the same optical functionality is achieved for biaxially birefringent layers for a plurality of combinations of $n_x$, $n_y$ and $n_z$, such layers are classified by two different parameters taking this into account, namely, by the following parameters:

$$R_e = (n_x - n_y)\cdot d \text{ and}$$

$$N_z = \frac{(n_x - n_z)}{(n_x - n_y)}.$$

The dotted curve is obtained for a thickness d=5.25 m, $R_e$=132 and $N_z$=3.84 at a wavelength of λ=550 nm in the green intermediate visible wavelength range in which the human eye has the highest sensitivity. The manner in which the refractive indices must relate to one another may be derived from $N_z$, that is, for example, $n_x$=1.6246, $n_y$=1.6 and $n_z$=1.5287. In order to produce correspondingly calculated layers with exactly these refractive indices, numerous production methods are known from the art by which the refractive indices can be highly controlled. By selecting a material possessing the desired refractive index relationship, the thickness d is adjusted such that $N_z$ is satisfied. Besides the parameters mentioned above, a noticeable improvement can also be achieved with other combinations, giving the behavior of the protected view effect shown by the dash-dot curve for $R_e$=75 and $N_z$=3.84. The values are to be regarded as merely illustrative but, in every case, tolerances of ±−20% are easily possible and included without noticeably reducing the protected view effect.

FIGS. 5A and 5B show the protected view effect for an optical film constructed in accordance with the second alternative shown in FIG. 1C with a first A* compensation layer 4, a second A* compensation layer 5 and an additional third C* compensation layer 6 between these two layers. The first absorption axis of the first polarization layer 1 is again perpendicular to the surface, i.e., it is a z-polarizer. Correspondingly, the first A* compensation layer 4 is formed as +A compensation layer with positive birefringence, the second A* compensation layer 5 is formed as −A compensation layer with negative birefringence, and the third C* compensation layer 6 is formed as −C compensation layer with negative birefringence. Alternatively, the first A* compensation layer 4 is formed as −A compensation layer with negative birefringence, the second A* compensation layer 5 is formed as +A compensation layer with positive birefringence, and the third C* compensation layer 6 is formed as +C compensation layer with negative birefringence, where negative birefringence means the case where $n_e < n_o$ and positive birefringence means the case where $n_e > n_o$.

Whereas no improvement is brought about by using the three additional compensation layers in addition to the z-polarizer at a vertical viewing angle of 0° (FIG. 5A) corresponding to a direct top view of the film along the surface normal, the improved protected view effect at a vertical viewing angle of 300 (FIG. 5B) is clearly apparent. The improvement shown in FIGS. 5A and 5B can be achieved with a series of compensation layers which satisfy the condition $d\cdot(n_e-n_o)$=264 nm for the first, +A compensation layer and the condition $d\cdot(n_o-n_e)$=−264 nm for the second, −A compensation layer with a tolerance of 20% in each instance. The condition $d\cdot(n_e-n_o)$=−22 nm is met for the third −C compensation layer, in which case the tolerance of 10 nm is higher. It is generally the case for the comparatively thin C* compensation layer that the tolerance is either 10 nm or 20% depending on which value is greater. In the alternative configuration with a first—A compensation layer, the mathematical signs are correspondingly reversed.

Figure 6B:
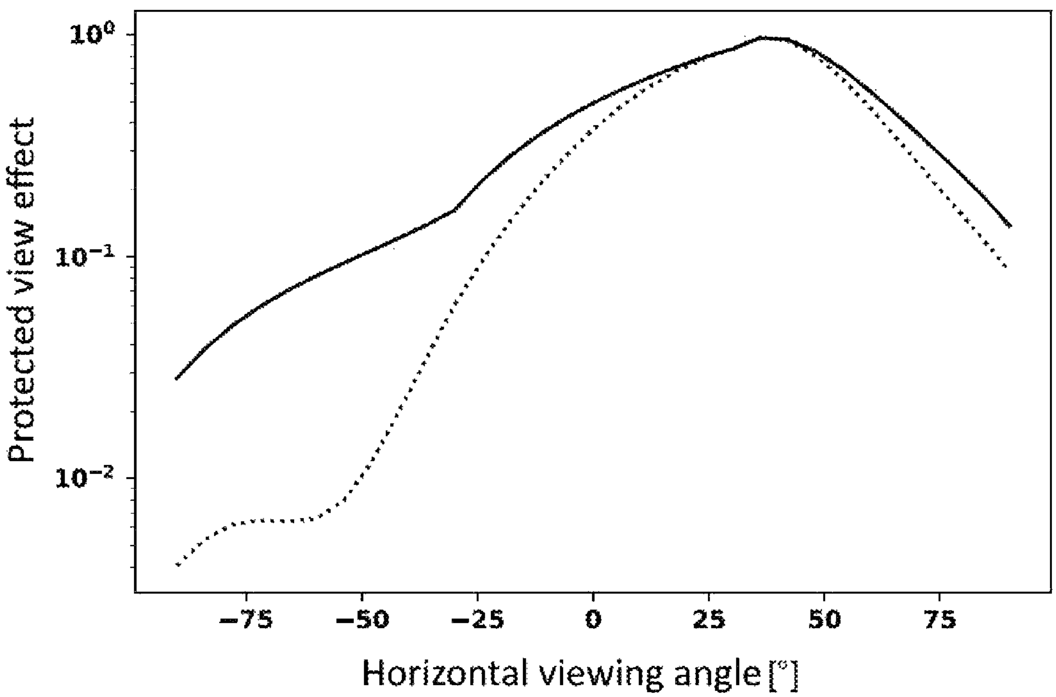

FIGS. 6A and 6B show the protected view effect for an optical film constructed in accordance with the second alternative shown in FIG. 1C with a first A* compensation layer 4, a second A* compensation layer 5 and an additional, third C* compensation layer 6 between these two layers. In contrast to FIGS. 5A, 5B, the first absorption axis of the first polarization layer is inclined in this instance by 20° against the surface normal to the surface and is accordingly a case of a z*-polarizer. This orientation then also dictates how the optical axes of the A* compensation layer and C* compensation layer must lie in order to obtain the protected view effects. The photoalignment and polymerization of LC mesogens may also be relied on, for example, to produce such inclined compensation layers. Without limiting generality, the first A* compensation layer 4 is configured as −A* compensation layer and the second A* compensation layer 5 is configured as +A* compensation layer. Correspondingly, the third C* compensation layer 6 is configured as −C* compensation layer. The improvement shown in FIGS. 6A and 6B can be accomplished with a series of compensation layers which satisfy the condition $d\cdot(n_e-n_o)$=264 nm for the first +A* compensation layer and the condition $d\cdot(n_o-n_e)$=−264 nm for the second −A* compensation layer with a tolerance of 20% in each instance. The condition $d\cdot(n_e-n_o)$=−82 nm is satisfied for the third −C* compensation layer, likewise with a tolerance of 20%. In the alternative configuration with a first −A* compensation layer, the mathematical signs are correspondingly reversed.

FIGS. 7A to 7F offer a detailed illustration of the effect of the individual layers with reference to polarization ellipses using the example of an optical film corresponding to the second alternative shown in FIG. 1C, wherein the first absorption axis of the first polarization layer 1 is oriented parallel to the surface normal of the optical film. For purposes of comparison, FIG. 7G shows the polarization of the light with a layer construction according to the prior art without additional compensation layers. The viewing direction of a notional viewer is along the surface normal of the optical film. FIGS. 7A to 7G all show a multiplicity of polarization ellipses which are distributed in a circle around the origin of a coordinate system. The position of each of the polarization ellipses corresponds to a viewing angle on the surface of the optical film. The viewing angle in the origin of the coordinate system corresponds to the surface normal, i.e., the top view perpendicular to the surface of the optical film. Without limiting generality, the direction running parallel to the shorter edge with reference to the plane of the drawing is designated as x-direction and the direction perpendicular thereto along the long edge of the plane of the drawing is designated as y-direction. The x-direction in this case also corresponds to the preferential direction and lies parallel to an imaginary line joining the eyes of a viewer and is therefore also referred to hereinafter as horizontal direction. Accordingly, polarization ellipses corresponding to viewing angles which deviate from zero exclusively horizontally, corresponding to a viewer moving away from the origin only laterally, lie on the x-axis of the coordinate system in FIGS. 7A to 7G. Polarization ellipses in which the viewing angle deviates from zero only vertically, corresponding to a viewer moving vertically up or down from the origin position, lie on the y-axis. A "vertical" movement or displacement is not to be interpreted as meaning that a viewer moves away from the optical film along the surface normal; that is, it does not mean a displacement along the surface normal in the horizontal plane defined by the surface normal and the horizontal direction between the eyes of a viewer. Rather, this means a displacement perpendicular to this plane. For example, if a seated first viewer looks at the optical film directly along the surface normal, the viewing angle of a second viewer sitting directly behind the first viewer lies only vertically offset to the y-axis. To better illustrate, two concentric circles are shown in each of the diagrams in FIGS. 7A to 7G. The inner circle defines a viewing angle cone of viewing angles of up to 25° in every direction, and the outer circle defines a viewing angle cone of viewing angles of up to 45° in every direction. The viewing angles from 90°, which are not actually perceivable, lie entirely outside.

Figure 7A:
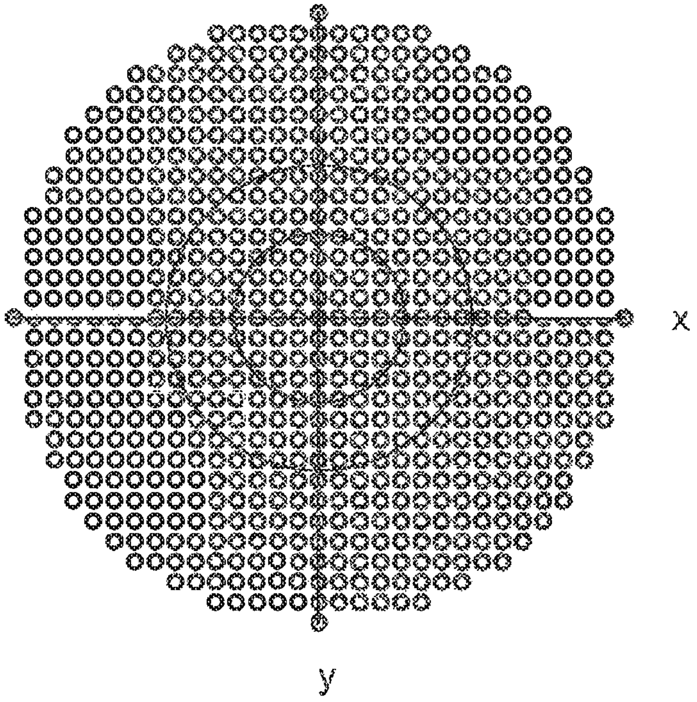
FIGS. 7A-7G polarization ellipses for the passage through the optical film.
Figure 7B:
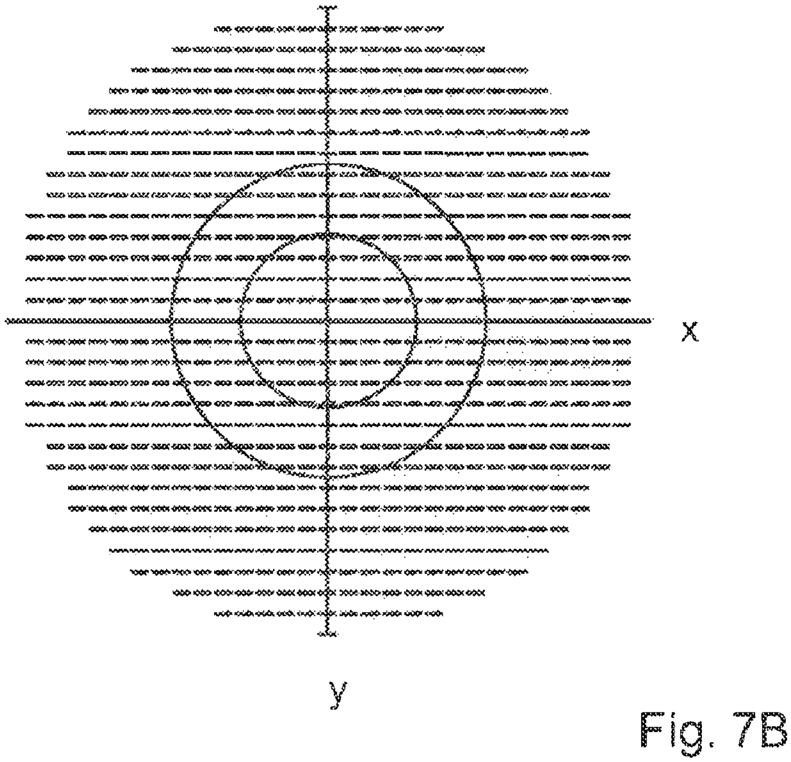
Figure 7C:
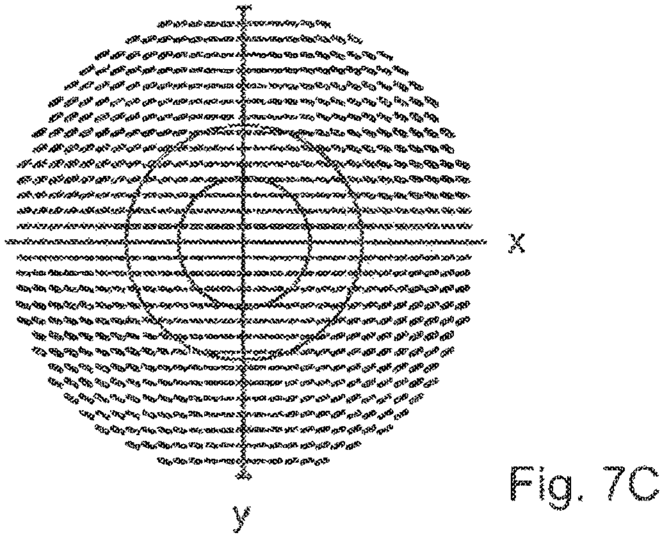

FIG. 7A shows circularly polarized light which is emitted by a backlight on the optical film. The light initially impinges on the second polarization layer 2 with a second absorption axis through which it is linearly polarized, since the second absorption axis of the second polarization layer 2 is oriented parallel to the surface of the film, in this case, along the horizontal direction or generally along a notional line joining the eyes of the viewer, which at the same time also corresponds to the preferential direction.

Figure 7D:
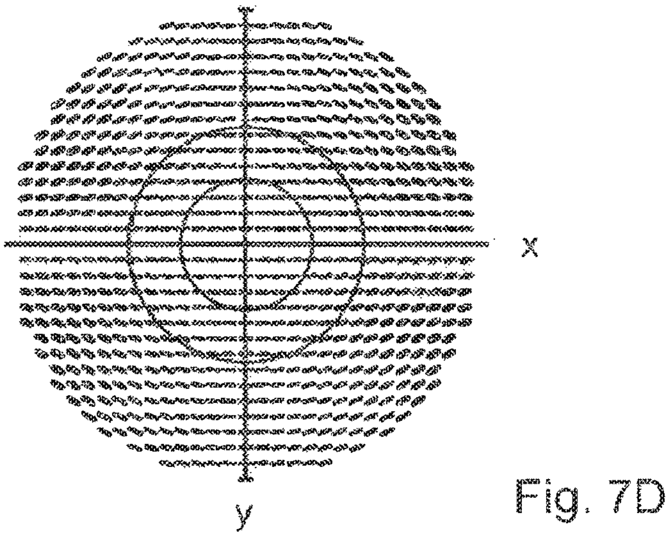
Figure 7E:
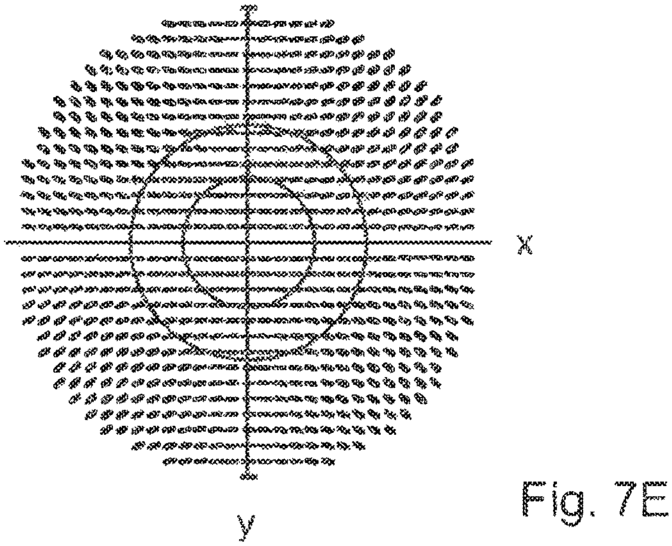

After passing through the second polarization layer, the linearly polarized light impinges on the second A* compensation layer 5 which is configured as −A compensation layer. While the polarization remains virtually unchanged especially in horizontal direction, but also in vertical direction, s-polarized light, i.e., light whose vector of the associated electric field is oriented perpendicular to the plane of incidence—that plane defined by the surface normal and the incident direction—is obtained in the viewing angle ranges with angles diverging therefrom after passing through—as seen from the top—for large areas as is shown in FIG. 7A. FIG. 7D shows the angle-resolved polarization after passing through the next layer, a third C* compensation layer 6. The latter is configured in this instance as a +C compensation layer. However, the changes are hardly detectable in the image because of the low birefringence and the fact that it is a C* compensation layer. FIG. 7E shows the polarization of the light after passing through the first A* compensation layer 4 which is configured in this instance as a +A* compensation layer. The light is approximately p-polarized over large portions, i.e., the vector of the electric field lies parallel to the plane of incidence, so that the absorption of light with non-perpendicular propagation directions through the subsequent first polarization layer 1, namely, the z-polarization layer, is increased. This is achieved by the combined action of the three above-mentioned compensation layers. The protected view effect is accordingly appreciably enhanced.

Figure 7F:
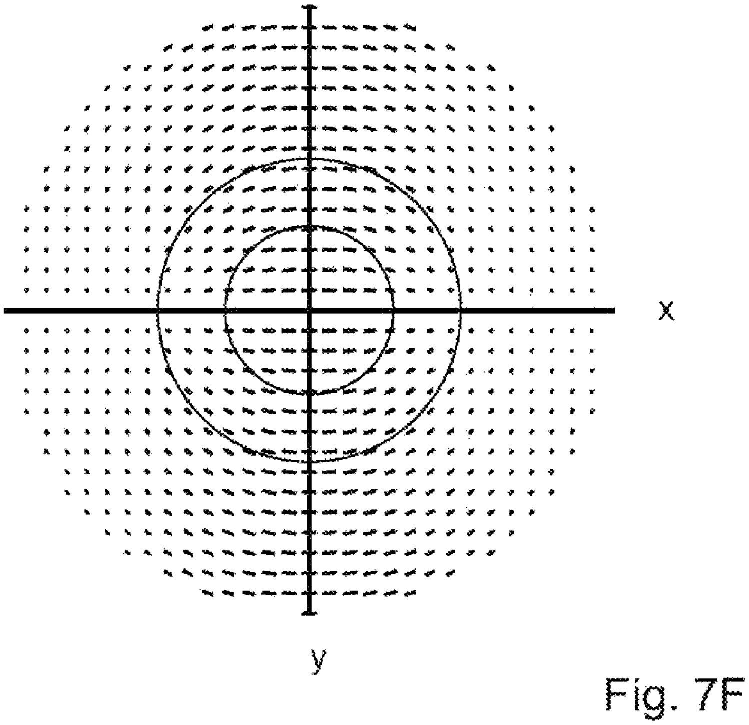
Figure 7G:
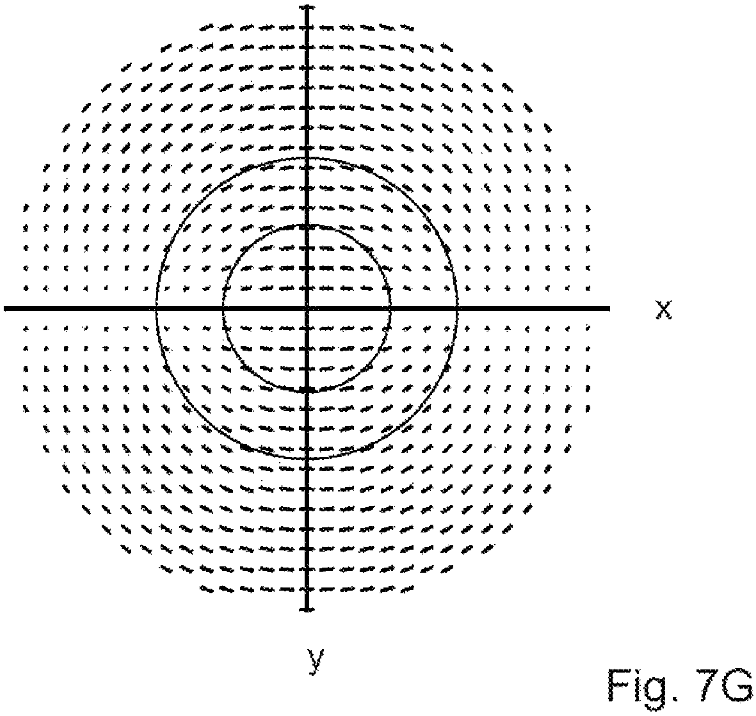
Fig. 7G Prior Art

Finally, FIG. 7F shows the polarization of the light after passing through the first polarization layer 1, namely, the z-polarization layer. For purposes of comparison, FIG. 7G shows the polarization of light according to the prior art in which the z-polarization layer directly adjoins the second polarization layer. The nearer the polarization ellipses approximate the point shape, the lower the luminance. It can clearly be seen here that the luminance in the dark area shown in FIG. 2 is further reduced compared with the prior art and the protected view effect is accordingly improved. This is achieved not as in the prior art by minimizing the luminance over the entire half-space—outside of a narrow cone of vision—but rather only over a real part of this half-space outside of the cone of vision, the specified solid angle range R. Specifically, the loss function $$C_2 = \int_R \ln T(\phi, \theta) d\Omega$$

is minimized in the specified solid angle range R, where T (φ, θ) is the angle-dependent transmission and Ω denotes the solid angle. This results in an appreciably improved reduction of luminance in the desired regions and, therefore, in an improved protected view.

Figure 8:
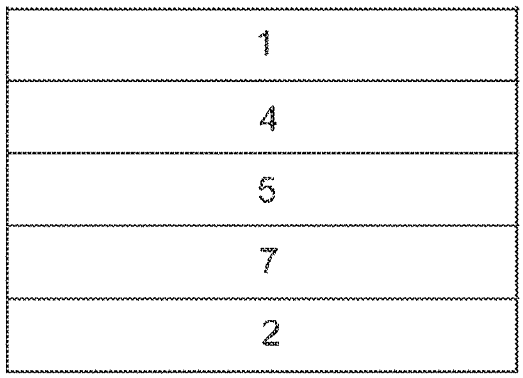
FIG. 8 a switchable embodiment of the optical film.

FIG. 8 shows an embodiment of an optical film with a first A* compensation layer 4 and a second A* compensation layer 5 analogous to FIG. 1B, but in which a liquid crystal layer 7 which is switchable between at least two states is arranged in addition between the second polarization layer 2 and a second A* compensation layer 5. The liquid crystal layer 7 is formed in such a way that, in a first switching state, it transmits light transmitted from the second polarization layer 2 with unchanged polarization or with polarization rotated by 90° and, in a second state, transmits light transmitted from the second polarization layer 2 so as to be circularly or elliptically polarized. Of course, a liquid crystal layer 7 which is switchable in this way can also be used in other possible configurations of the optical film, particularly in those shown in FIGS. 1A and 1C.

Figure 10:
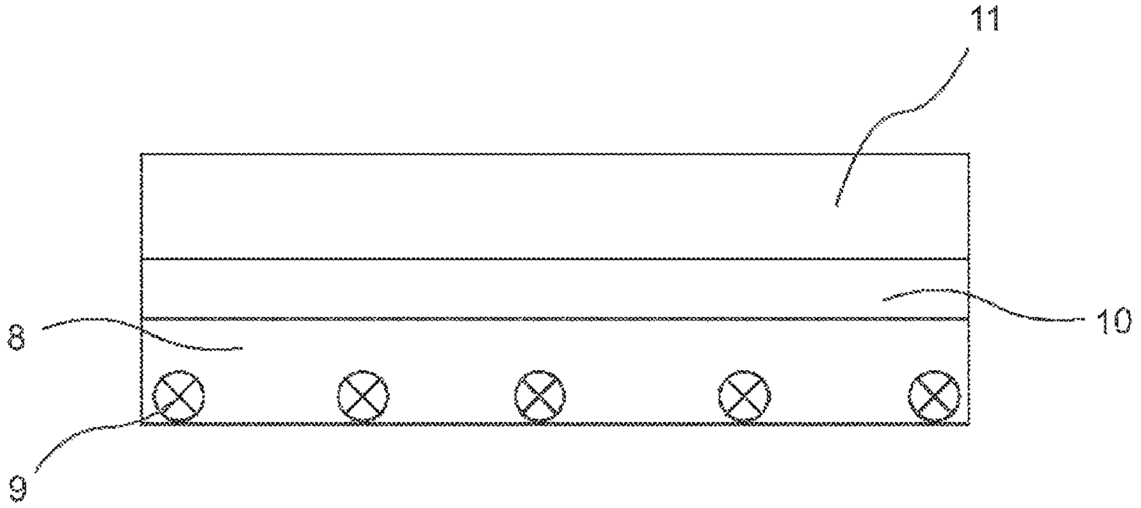
FIG. 10 a display screen with a switchable optical film.
Figure 11:
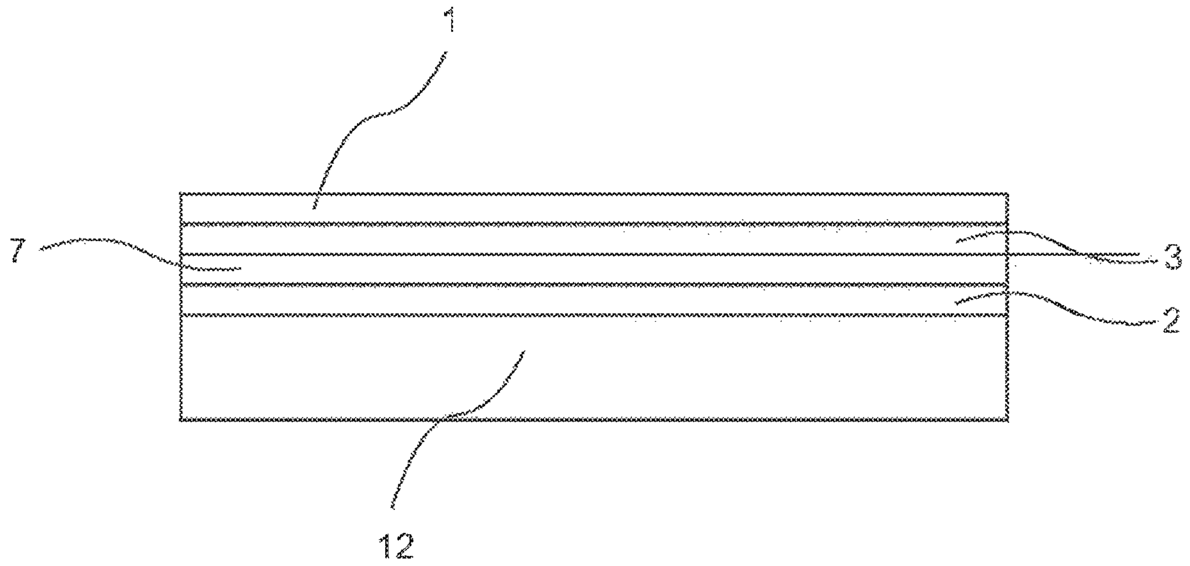
FIG. 11 a further display screen with a switchable optical film.

The display screens shown in FIGS. 10 and 11, for example, can be realized in this way. FIG. 10 shows a display screen which can be operated in at least two operating modes, operating mode B1 for a free viewing mode and operating mode B2 for a limited viewing mode in which light is emitted in a viewing angle range that is limited for a viewer compared with the free viewing mode. In order to switch between the two operating modes, the display screen comprises a backlight 8 which extends in a planar manner, comprises an optical film, not shown separately here, with the liquid crystal layer 7 which is switchable between at least two states, and emits light, represented by a quantity of light sources 9. It will be understood, however, that this is merely a general outline. It may also be a surface emitter, for example, or an edge-lit light guide with patterned surfaces which can optionally comprise additional optical layers, such as diffuser films or prism films. The backlight can also optionally be formed to be directly lighting, for example, as direct matrix backlight dimming. Arranged in front of the backlight 8 in viewing direction is a linear polarization filter 10 which limits the propagation directions of light emanating from the backlight 8 and passing through the linear polarization filter 10. A transmissive image reproduction device 11 is arranged in front of the backlight 8 in viewing direction. Here the linear polarization filter 10 is arranged behind the transmissive image reproduction device 11 with reference to the viewing direction. It should be arranged as close as possible to the latter, i.e. no further layers should be arranged therebetween if possible. However, the linear polarization filter 10 is preferably arranged in the transmissive image reproduction device 11, i.e., is a part thereof or is at least integrated therein. In operating mode B2, the liquid crystal layer 7 which is switchable between at least two states is in the first switching state and, in operating mode B1, the liquid crystal layer 7 which is switchable between at least two states is in the second switching state. Accordingly, the switchable liquid crystal layer makes it possible to switch between a public operating mode, in which the image contents shown on the display screen can be viewed in an unrestricted manner from numerous viewing angles, and a protected view mode in which the displayed image contents are only visible in a narrow viewing angle range in a cone around the first absorption axis of the first polarization layer 1 with sufficient brightness.

FIG. 11 shows a further configuration of a display screen which can be operated in at least two operating modes, operating mode B1 for a public viewing mode and operating mode B2 for a limited viewing mode in which light is emitted in a viewing angle range that is limited for a viewer compared to the public viewing mode. It comprises an image reproduction device 12 which is known from the prior art and which can be configured, for example, as an actively lighting image reproduction device 12 based on OLED or micro-LED or as a passively lighting, i.e., lit, image reproduction device 12 based, for example, on LCD. An optical film with a liquid crystal layer 7 switchable between at least two states is arranged in front of the image reproduction device 12 in viewing direction. The optical film in this instance is constructed according to the first alternative, for example, wherein a first, spatially homogeneous B* compensation layer 3 comprising a biaxially birefringent material is arranged between the first polarization layer 1 and the second polarization layer 2. However, the second polarization layer 2 may also be configured, for example, as a rear polarizer of an LCD display of the image reproduction device 12. Of course, all of the other configurations of optical films described above are also usable with a switchable liquid crystal layer 7. As in the previously described display screen, the liquid crystal layer 7 which is switchable between at least two states is also in the first switching state in operating mode B2 and in the second switching state in operating mode B1. This configuration is particularly well-suited for retrofitting existing display screens.

Figure 9A:
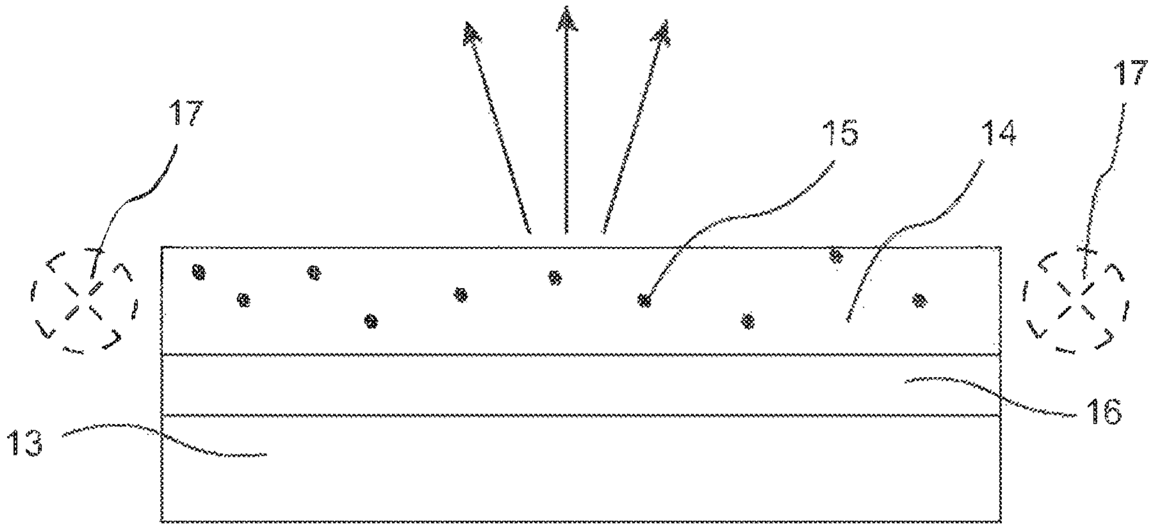
FIGS. 9A-9B an illumination device with a non-switchable optical film in two operating states.
Figure 9B:
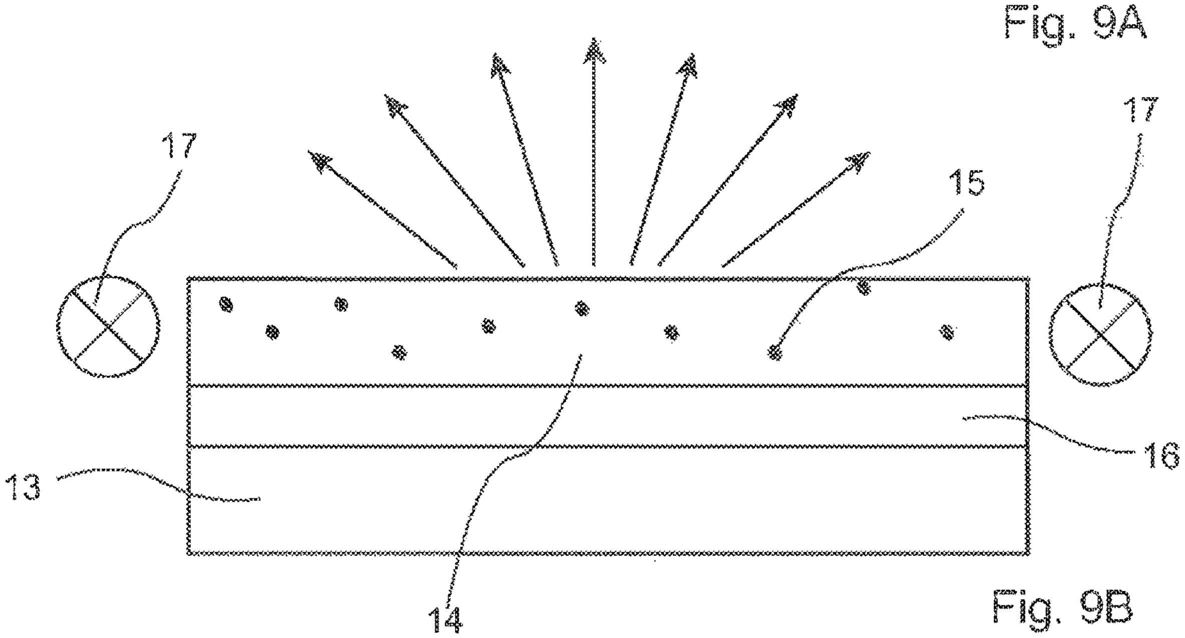

Alternatively, illumination devices for display screens can also be produced with an optical film which does not have a switchable liquid crystal layer 7 and configured in such a way that they can be operated in at least two operating modes, operating mode B1 for a public viewing mode and operating mode B2 for a limited viewing mode in which light is emitted in a solid angle range that is limited compared to the public viewing mode. FIGS. 9A and 9B show an example of such an illumination device in the two operating modes. When the illumination device is combined with an image reproduction device which is arranged in front in viewing direction and on which image contents can be displayed, a display screen is obtained which can be switched between the two operating modes B1 and B2.

The illumination device shown in FIGS. 9A and 9B comprises a backlight 13 extending in a planar manner in which a static, i.e., non-switchable, optical film such as that shown by way of example in FIGS. 1A-1C is integrated. A plate-shaped light guide 14 which has outcoupling elements on at least one of the large surfaces and/or within its volume is located in front of the backlight 13 in viewing direction. In the example shown here, outcoupling elements 15 are arranged in the volume of the light guide 14. A linear polarization filter 16 is arranged in front of the backlight 13 or in front of the light guide 14 in viewing direction. Light which emanates from the backlight 13 accordingly passes through the optical film and subsequently passes through the linear polarization filter 16 and is accordingly limited with respect to its propagation directions in principal. Optionally, the linear polarization filter 16 can also take on the function of the second polarization layer 2, i.e., can correspond to the latter. Illuminants 17 which radiate light into the light guide 14 in the switched on state are arranged laterally on at least one narrow side of the light guide 14—in this case, at two narrow sides. The light radiated by the illuminants 17 is reflected back and forth in the light guide 14 by total internal reflection until it impinges on outcoupling elements 15 which deflect the light such that it travels through the surface of the light guide 14 outward in direction of the viewer. The outcoupling elements 15 are designed in such a way that they deflect light virtually exclusively in this direction and pass light emanating from the backlight 13 virtually unimpeded.

FIG. 9A shows the illumination device in operating mode B2 for the limited viewing mode in which only a small—usually conical—solid angle range is illuminated, designated by the arrows over the surface of the light guide 14. In this case, exclusively the backlight 13 is switched on. The illuminants 17 must be switched off. In contrast, FIG. 9B shows the illumination device in operating mode B1 for the public viewing mode in which light is emitted in an appreciably larger or wider solid angle range compared with operating mode B2, again designated by the arrows above the light guide 14. In this case, the illuminants 17 must be switched on. Their light which is radiated into the light guide 14 and coupled out through the outcoupling elements 15 provides for the widening of the illuminated solid angle range. The backlight 13 can be switched off or switched on in operating mode B1. A more homogeneous illumination of the solid angle range in operating mode B1 is usually obtained when the backlight 13 is switched off.

In combination with a passive image reproduction device which is illuminated from behind by means of the illumination device shown in FIGS. 9A and 9B, the viewer of image contents displayed on the image reproduction device is presented with the limited viewing mode B2 or the public viewing mode B1 depending on whether the illuminants 17 are switched on or switched off.

The optical film described above can advantageously be used in combination with an image reproduction device, possibly with a separate illumination device, anywhere that confidential data are displayed and/or entered, such as when entering a PIN number or displaying data in automatic teller machines or payment terminals or for entering passwords or when reading emails on mobile devices. In particular, the invention can also be applied in motor vehicles to selectively withhold distracting image contents from the driver or passenger.

REFERENCE CHARACTERS

1 first polarization layer
2 second polarization layer
3 first B* compensation layer
4 first A* compensation layer
5 second A* compensation layer
6 third C* compensation layer
7 liquid crystal layer
8 backlight
9 light source
10 linear polarization filter
11 image reproduction device
12 image reproduction device
13 backlight
14 light guide
15 outcoupling element
16 polarization filter
17 illuminant
R solid angle range

The invention claimed is:

1. A backlight which extends in a planar manner, emits light and has an optical film for controlling and limiting a viewing angle range of a viewer, the optical film comprising:

a first polarization layer with a first absorption axis which forms an angle from 0° to 30° with a surface normal of the optical film, at least one phase-shifting compensation layer for improving the limiting of the viewing angle range, and a second polarization layer with a second absorption axis which is oriented parallel to the surface of the optical film, wherein:

i. in a first alternative, a first B* compensation layer which is formed to be spatially homogeneous and comprises a first biaxially birefringent material with two optical axes and three principal refractive axes is arranged between the first polarization layer and the second polarization layer, wherein a refractive index $n_x$, $n_y$, $n_z$ is uniquely associated with each of the principal refractive axes, wherein either the principal refractive axis to which the lowest refractive index corresponds or the principal refractive axis to which the highest refractive index corresponds lies parallel to the first absorption axis, and wherein a condition $$\Delta ph = \frac{2\pi}{\lambda} d \cdot |n_x - n_y| < 2\pi$$

is met for the first B* compensation layer, where d is a thickness of the first B* compensation layer, Δph is a phase shift, and λ is a given wavelength; and ii. in a second alternative, at least two compensation layers comprising uniaxially birefringent materials are arranged between the first polarization layer and the second polarization layer, wherein:

a first, spatially homogeneous A* compensation layer comprises a first uniaxially birefringent material with a first optical axis and two first principal refractive axes differing from one another, wherein the first optical axis lies perpendicular to or parallel to the first absorption axis of the first polarization layer, and, behind this viewed from the direction of a viewer, is arranged; and a second, spatially homogeneous A* compensation layer which comprises a second uniaxially birefringent material with a second optical axis and two second principal refractive axes, wherein the second optical axis lies perpendicular to the first optical axis, wherein a condition $$\Delta ph = \frac{2\pi}{\lambda} d \cdot |n_e - n_o| < 2\pi,$$

where d is a thickness of a compensation layer, $n_e$ is an extraordinary refractive index, $n_o$ is an ordinary refractive index, Δph is the phase shift, and λ is a given wavelength, is met for each of the compensation layers, and wherein, in both alternatives i. and ii., the materials and the thicknesses d of the compensation layers are specified such that, measured in a spherical coordinate system having an origin on the surface of the film and in the plane of the surface of the film, the luminance is minimal exclusively in a specified solid angle range R which comprises azimuthal angles $\varphi$ for which $|\varphi|$ and $|180°-\varphi|$ are less than the amount of a predetermined limiting azimuthal angle $\varphi_{lim}$ measured with reference to a preferential direction in the plane of the surface of the film, and a polar angle $\theta$ of a greater magnitude than a predetermined limiting polar angle $\theta_{lim}$ measured with reference to the surface normal or, if the first absorption axis does not lie parallel to the surface normal, measured with reference to the first absorption axis and in a plane which is defined by the surface normal and the first absorption axis.

2. The backlight according to claim 1, in the second alternative ii., wherein a third, spatially homogeneous C* compensation layer which is formed of a third uniaxially birefringent material with a third optical axis and two third principal refractive axes, and wherein the third optical axis lies parallel to the first absorption axis of the first polarization layer, is arranged between the first A* compensation layer and the second A* compensation layer.

3. The backlight according to claim 1, wherein the first absorption axis is oriented perpendicular to the surface of the film.

4. The backlight according to claim 3, in the first alternative i., wherein the principal refractive axis to which the lowest refractive index corresponds lies parallel to the first absorption axis, wherein the first B* compensation layer is formed as −B compensation layer, with $n_x>n_y>n_z$, with the main refractive axis to which the lowest refractive index $n_z$ corresponds parallel to the surface normal, and with the principal refractive axis to which the highest refractive index $n_x$ corresponds parallel to the second absorption axis of the second polarization layer.

5. The backlight according to claim 3, in the first alternative i., wherein the principal refractive axis to which the highest refractive index corresponds lies parallel to the first absorption axis, wherein the first B* compensation layer is formed as +B compensation layer, with $n_z>n_x>n_y$, with the principal refractive axis to which the highest refractive index $n_z$ corresponds parallel to the surface normal, and with the principal refractive axis to which the lowest refractive index $n_y$ corresponds parallel to the second absorption axis of the second polarization layer.

6. The backlight according to claim 3, in the second alternative ii., wherein the first A* compensation layer is formed as +A compensation layer, the second A*compensation layer is formed as −A compensation layer, or vice versa, and a third C* compensation layer, insofar as any is provided, is formed as −C compensation layer or +C compensation layer.

7. The backlight according to claim 1, in the second alternative ii., wherein the first A* compensation layer and second A* compensation layer are formed identically.

8. The backlight according to claim 1, wherein a liquid crystal layer which is switchable between at least two states is arranged between the second polarization layer and the compensation layer arranged closest to the second polarization layer, the liquid crystal layer being formed such that light transmitted by the second polarization layer is transmitted by the liquid crystal layer with unchanged polarization or with polarization rotated by 90° in a first switching state and with circular or elliptical or linear polarization in a second switching state.

9. A display screen which can be operated in at least two operating modes, an operating mode B1 for a free viewing mode and an operating mode B2 for a limited viewing mode in which light is emitted in a viewing angle range that is limited for a viewer compared to the free viewing mode, comprising:

the backlight according to claim 8 with the liquid crystal layer which is switchable between at least two states, a linear polarization filter arranged in front of the backlight in a viewing direction, as a result of which light emanating from the backlight and passing through the linear polarization filter is limited with respect to light propagation directions, and a transmissive image reproduction device which is arranged in front of the backlight in the viewing direction and in which, or behind which, the linear polarization filter is arranged, wherein the liquid crystal layer which is switchable between the at least two states is in the first switching state in the operating mode B2, and wherein the liquid crystal layer which is switchable between the at least two states is in the second switching state in the operating mode B1.

10. The backlight according to claim 1, wherein a liquid crystal layer which is switchable between at least two states is arranged between the first polarization layer and the compensation layer arranged closest to the first polarization layer, the liquid crystal layer being formed such that light transmitted by the first polarization layer is transmitted by the liquid crystal layer with unchanged polarization or with polarization rotated by 90° in a first switching state and with circular or elliptical or linear polarization in a second switching state.

11. The backlight according to claim 1, wherein a loss function $C_2=\int_R \ln T(\phi, \theta)\, d\Omega$ is minimal in the specified solid angle range R, where $T(\varphi, \theta)$ is the angle-dependent transmission and $\Omega$ denotes the solid angle range.

12. The backlight according to claim 1, wherein the limiting azimuthal angle $\varphi_{lim}$ is between 30° and 40° around a preferential direction and/or the limiting polar angle $\theta_{lim}$ is between 40° and 50°.

13. An illumination device for a display screen, wherein the illumination device is configured such that the illumination device can be operated in at least two operating modes, operating mode B1 for a free viewing mode and operating mode B2 for a limited viewing mode in which light is emitted in a solid angle range which is limited compared to the free viewing mode, comprising:

a backlight according to claim 1, a plate-shaped light guide which is located in front of the backlight in a viewing direction and has outcoupling elements on at least one of the large surfaces and/or within a volume of the plate-shaped light guide, illuminants arranged laterally at least at one narrow side of the light guide, and a linear polarization filter which is arranged in front of the backlight or in front of the light guide in the viewing direction, as a result of which light which emanates from the backlight and passes through the linear polarization filter is limited with respect to light propagation directions, wherein the backlight is switched on and the illuminants are switched off in operating mode B2, and wherein at least the illuminants are switched on in operating mode B1.

14. A display screen which can be operated in at least two operating modes, an operating mode B1 for a free viewing mode and an operating mode B2 for a limited viewing mode in which light is emitted in a viewing angle range that is limited for a viewer relative to the free viewing mode, comprising:

an image reproduction device; and an optical film which is arranged in front of the image reproduction device in a viewing direction and which has a liquid crystal layer which is switchable between at least two states, wherein the liquid crystal layer is in the first switching state in operating mode B2, and wherein the liquid crystal layer is in the second switching state in the operating mode B1, the optical film comprising a first polarization layer with a first absorption axis which forms an angle from 0° to 30°, inclusive, with a surface normal of the optical film, at least one phase-shifting compensation layer for improving the limiting of the viewing angle range, and a second polarization layer with a second absorption axis which is oriented parallel to the surface of the optical film, wherein i. in a first alternative, a first B* compensation layer which is formed to be spatially homogeneous and comprises a first biaxially birefringent material with two optical axes and three principal refractive axes is arranged between the first polarization layer and the second polarization layer, wherein a refractive index $n_x$, $n_y$, $n_z$ is uniquely associated with each of the principal refractive axes, wherein either the principal refractive axis to which the lowest refractive index corresponds or the principal refractive axis to which the highest refractive index corresponds lies parallel to the first absorption axis, and wherein a condition $$\Delta ph = \frac{2\pi}{\lambda} d \cdot |n_x - n_y| < 2\pi$$

is met for the first B* compensation layer, where d is a thickness of the first B* compensation layer, Δph is the phase shift, and λ is a given wavelength, and ii. in a second alternative, at least two compensation layers comprising uniaxially birefringent materials are arranged between the first polarization layer and the second polarization layer, wherein:

a first, spatially homogeneous A* compensation layer comprises a first uniaxially birefringent material with a first optical axis and two first principal refractive axes differing from one another, wherein the first optical axis lies perpendicular to or parallel to the first absorption axis of the first polarization layer, and, behind this viewed from the direction of a viewer, is arranged; and a second, spatially homogeneous A* compensation layer which comprises a second uniaxially birefringent material with a second optical axis and two second principal refractive axes, wherein the second optical axis lies perpendicular to the first optical axis, wherein a condition $$\Delta ph = \frac{2\pi}{\lambda} d \cdot |n_e - n_o| < 2\pi,$$

where d is a thickness of a compensation layer, $n_e$ is an extraordinary refractive index, $n_o$ is an ordinary refractive index, Δph a phase shift, and Δ is a given wavelength, is met for each of the compensation layers, wherein, in both alternatives i. and ii., the materials and thicknesses d of the compensation layers are specified such that, measured in a spherical coordinate system having an origin on the surface of the film and in the plane of the surface of the film, the luminance is minimal exclusively in a specified solid angle range R which comprises azimuthal angles φ for which |φ| and |180°−φ| are less than an amount of a predetermined limiting azimuthal angle $\varphi_{lim}$ measured with reference to a preferential direction in the plane of the surface of the film, and a polar angle θ of a greater magnitude than a predetermined limiting polar angle $\theta_{lim}$ measured with reference to the surface normal or, if the first absorption axis does not lie parallel to the surface normal, measured with reference to the first absorption axis and in a plane which is defined by the surface normal and the first absorption axis, and wherein:

either a liquid crystal layer which is switchable between at least two states and which is formed such that light transmitted by the second polarization layer is transmitted by the liquid crystal layer with unchanged polarization or with polarization rotated by 90° in a first switching state and with circular or elliptical or linear polarization in a second switching state is arranged between the second polarization layer and the compensation layer arranged closest to the second polarization layer;

or the liquid crystal layer which is switchable between the at least two states and which is formed such that light transmitted by the first polarization layer is transmitted by the liquid crystal layer with unchanged polarization or with polarization rotated by 90° in a first switching state and with circular or elliptical or linear polarization in a second switching state is arranged between the first polarization layer and the compensation layer arranged closest to the first polarization layer.

15. The display screen according to claim 14, in the second alternative ii., wherein a third, spatially homogeneous C* compensation layer which is formed of a third uniaxially birefringent material with a third optical axis and two third principal refractive axes, and wherein the third optical axis lies parallel to the first absorption axis of the first polarization layer, is arranged between the first A* compensation layer and the second A* compensation layer.

* * * * *